United States Patent
Li et al.

(10) Patent No.: US 11,989,881 B2
(45) Date of Patent: *May 21, 2024

(54) SYSTEMS AND METHODS FOR IMAGING DEVICE

(71) Applicant: SHANGHAI UNITED IMAGING HEALTHCARE CO., LTD., Shanghai (CN)

(72) Inventors: Cuifang Li, Shanghai (CN); Shihong Han, Shanghai (CN); Gongze Zhu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 19 days.

This patent is subject to a terminal disclaimer.

(21) Appl. No.: 17/659,495

(22) Filed: Apr. 18, 2022

(65) Prior Publication Data

US 2022/0245813 A1    Aug. 4, 2022

Related U.S. Application Data

(63) Continuation of application No. 16/898,423, filed on Jun. 10, 2020, now Pat. No. 11,393,095.

(30) Foreign Application Priority Data

Oct. 30, 2019    (CN) .......................... 201911047881.1

(51) Int. Cl.
G06T 7/00    (2017.01)
G06T 1/20    (2006.01)
G06T 1/60    (2006.01)

(52) U.S. Cl.
CPC .............. *G06T 7/0014* (2013.01); *G06T 1/20* (2013.01); *G06T 1/60* (2013.01); *G06T 2207/10124* (2013.01); *G06T 2207/20104* (2013.01)

(58) Field of Classification Search
None
See application file for complete search history.

(56) References Cited

U.S. PATENT DOCUMENTS 6,907,099 B2 * 6/2005 Kling .................... G06T 11/006
                                                                   378/4
9,235,889 B1 * 1/2016 Frenkel ..................... G06T 1/60
(Continued)

FOREIGN PATENT DOCUMENTS

CN    105078495 A    11/2015
CN    107403287 A    11/2017
(Continued)

OTHER PUBLICATIONS

Qian, Gennian et al., Quality Control of PET/CT System, Journal of China Medical Devices, 34(2): 1-4, 2019.
(Continued)

*Primary Examiner* — Anand P Bhatnagar
(74) *Attorney, Agent, or Firm* — METIS IP LLC

(57) ABSTRACT

A method and system for acquiring scan data. The system includes a processing device and an imaging device. The processing device is configured to generate a target protocol group corresponding to a plurality of target bed positions by adjusting, based on a reference image, at least one parameter of an initial protocol group. The target protocol group includes a target general protocol for localizing the plurality of target bed positions and a plurality of target primary protocols for localizing each of the plurality of target bed positions. The imaging device is configured to acquire scan (Continued)

data by scanning the object based on the target protocol group.

20 Claims, 18 Drawing Sheets

(56) References Cited

U.S. PATENT DOCUMENTS

| | | | | |
|---|---|---|---|---|
| 10,485,638 | B2* | 11/2019 | Salah | A61C 7/002 |
| 10,765,321 | B2* | 9/2020 | Kargar | A61B 6/545 |
| 11,000,254 | B2* | 5/2021 | Profio | A61B 6/0487 |
| 11,096,649 | B2* | 8/2021 | Takemoto | A61B 6/0407 |
| 11,100,684 | B2* | 8/2021 | Hein | G06T 11/005 |
| 2010/0040268 | A1* | 2/2010 | Boeing | A61B 6/482 |
| | | | | 382/128 |
| 2014/0037049 | A1* | 2/2014 | Langan | A61B 6/0487 |
| | | | | 378/20 |
| 2014/0378816 | A1* | 12/2014 | Oh | A61B 6/54 |
| | | | | 600/407 |
| 2015/0119703 | A1 | 4/2015 | Mitchell et al. | |
| 2015/0301137 | A1* | 10/2015 | Keil | G01R 33/543 |
| | | | | 324/309 |
| 2016/0223633 | A1 | 8/2016 | Xiong et al. | |
| 2017/0084057 | A1 | 3/2017 | Li et al. | |
| 2017/0238882 | A1* | 8/2017 | Ma | A61B 6/03 |
| 2019/0046131 | A1* | 2/2019 | Wu | A61B 5/055 |
| 2021/0204888 | A1* | 7/2021 | Shen | G06T 11/003 |

FOREIGN PATENT DOCUMENTS

| | | |
|---|---|---|
| CN | 107451410 A | 12/2017 |
| CN | 109805951 A | 5/2019 |
| CN | 109924993 A | 6/2019 |

OTHER PUBLICATIONS

Chen, C.-H. et al., Optimized Protocols in Terms of Equalizing the True and Accidental Coincidences of Each Bed Position in Static Multiple Bed Position Carbon-11 PET Studies and a Target Single Bed Position Study, Nuclear Medicine Communications, 22(10): 1061-1068, 2001.

* cited by examiner

300

1400

1500

1600

1700

1800

SYSTEMS AND METHODS FOR IMAGING DEVICE

CROSS-REFERENCE TO RELATED APPLICATION

This application is a continuation of U.S. application Ser. No. 16/898,423, filed on Jun. 10, 2020, which claims priority to Chinese Patent Application No. 201911047881.1 filed on Oct. 30, 2019, the contents of each of which are hereby incorporated by reference.

TECHNICAL FIELD

The present disclosure relates to an imaging device, and more particularly, relates to systems and methods for acquiring imaging data according to a scanning protocol and reconstructing an image based on the acquired imaging data.

BACKGROUND

Medical imaging is the technique and process of creating visual representations of the interior of a body for clinical analysis and medical intervention, as well as visual representation of the function of some organs or tissues (physiology). An imaging device may acquire data and reconstruct an image based on a scanning process using an imaging technology, such as X-ray radiography, magnetic resonance imaging, medical ultrasonography or ultrasound, endoscopy, electrography, tactile imaging, thermography, medical photography, and nuclear medicine functional imaging techniques such as positron emission tomography (PET) and single-photon emission computed tomography (SPECT). During the scanning process, especially for the scanning of a large area (e.g., a whole-body scanning), the workflow and/or scanning protocols applied in the scanning process may affect the image quality and efficiency. It may be desirable to provide systems and methods for determining an optimized scanning protocol and/or workflow for such a large-area scanning.

SUMMARY

In a first aspect of the present disclosure, a method is provided. The method may be implemented on at least one machine each of which has at least one processor and at least one storage device. The method may include one or more of the following operations. A reference imaging protocol relating to an object to be imaged may be obtained. The object may be supported on a bed. A reference image of the object may be generated based on the reference imaging protocol. An initial protocol group may be obtained. A target protocol group corresponding to a plurality of target bed positions may be generated by adjusting, based on the reference image, at least one parameter of the initial protocol group. The target protocol group may include a target general protocol for localizing the plurality of target bed positions and a plurality of target primary protocols for localizing each of the plurality of target bed positions. Scan data may be acquired by scanning the object based on the target protocol group.

In some embodiments, the initial protocol group may include an initial general protocol. One or more initial general parameters of the initial general protocol may be adjusted based on a height of the object and/or region of interest (ROI) information of the object.

In some embodiments, the initial protocol group may correspond to a plurality of initial bed positions. The one or more initial general parameters may include at least one of a first count of the plurality of initial bed positions, a combined imaging region of the plurality of initial bed positions, an imaging region for each of the plurality of initial bed positions, or an overlap imaging region between two adjacent initial bed positions.

In some embodiments, each of the plurality of target primary protocols may include one or more local parameters. The one or more local parameters may include a protocol ID, slice group information, a slice gap, a slice thickness, an FoV (Field of View) read, an FoV phase, dimension information, overlap region information, or identification information of a bed position.

In some embodiments, the target protocol group may further include one or more target supplement protocols. Each of the one or more target supplement protocols may correspond to one of the plurality of target primary protocols. For a target primary protocol corresponding to a target bed position and a target supplement protocol corresponding to the target primary protocol, first scan data may be acquired by scanning the object based on the target primary protocol; and second scan data may be acquired by scanning the object based on the target supplement protocol.

In some embodiments, a control mode of the bed may be set, wherein the control mode includes a fixed mode, an off-center mode, or a free-bed mode. In the fixed mode, a first position of the bed defined by the target supplement protocol may be the same as a second position of the bed defined by the target primary protocol, and a first slice center defined by the target supplement protocol may be the same as a second slice center defined by the target primary protocol. In the off-center mode, the first position of the bed defined by the target supplement protocol may be the same as the second position of the bed defined by the target primary protocol, and the first slice center defined by the target supplement protocol may be different from the second slice center defined by the target primary protocol. In the free-bed mode, the first position of the bed defined by the target supplement protocol may be different from the second position of the bed defined by the target primary protocol, and the first slice center defined by the target supplement protocol may be different from the second slice center defined by the target primary protocol.

In some embodiments, the method may further include one or more of the following operations. One or more imaging portions of the object may be determined. One or more single-bed position protocols corresponding to the one or more imaging portions may be obtained. One or more initial protocol groups based on the one or more single-bed position protocols may be generated.

In some embodiments, a second count of the one or more single-bed position protocols may be determined and the one or more initial protocol groups may be generated based on whether the second count is greater than 1.

In some embodiments, if the second count is great than 1 and the one or more initial protocol groups may be generated based on whether the one or more single-bed position protocols satisfy a preset condition.

In some embodiments, each of the one or more initial protocol groups may include an initial general protocol, a first primary protocol, and one or more subsequent primary protocols. If it is determined that at least one of the one or more single-bed position protocols fails to satisfy the preset condition, one or more initial protocol groups may be generated by a first process. The first process may include one or more of the following operations for each of the one or more single-bed position protocols. A third count of initial bed positions may be obtained. Position information for each of the initial bed positions may be determined. Initial local parameters and initial general parameters of the initial general protocol may be preset. The initial general protocol may be determined based on the position information for each of the initial bed positions, the preset initial local parameters, and the preset initial general parameters. The first primary protocol may be determined based on the each single-bed protocol. The one or more subsequent primary protocols may be determined based on the each single-bed protocol and the initial general parameters. The initial protocol group may be generated based on the initial general protocol, the first primary protocol, and the one or more subsequent primary protocols.

In some embodiments, each of the one or more initial protocol groups may include an initial general protocol and a plurality of initial primary protocols. If it is determined that each of the one or more single-bed position protocols satisfies the preset condition, the one or more initial protocol groups may be determined by a second process. The second process may include one or more of the following operations. A plurality of single-bed position protocols that satisfy the preset condition may be obtained. The plurality of single-bed position protocols may correspond to a plurality of initial bed positions. Position information of the plurality of initial bed positions may be determined based on slice center position information defined by the plurality of single-bed position protocols. Initial local parameters and initial general parameters of the initial general protocol may be preset. The initial general protocol may be determined based on the position information of the plurality of initial bed positions, the preset initial local parameters, and the preset initial general parameters. The plurality of initial primary protocols may be determined based on the plurality of single-bed position protocols. The initial protocol group may be generated based on the initial general protocol and the plurality of initial primary protocols.

In some embodiments, the preset condition may include at least one of the one or more single-bed position protocols share a same scanning sequence; at least two of imaging regions defined by the one or more single-bed position protocols have an overlap region; and bed positions defined by the one or more single-bed position protocols are within a range in a direction along a length of the bed.

In some embodiments, the one or more single-bed position protocols may include only one single-bed position protocol, each of the one or more initial protocol groups may include an initial general protocol, a first primary protocol, and one or more subsequent primary protocols. If it is determined that the second count is not greater than 1, the generating the one or more initial protocol groups may include one or more of the following operations. A fourth count of initial bed positions may be obtained. Position information for each of the initial bed positions may be determined. Initial local parameters and initial general parameters of the initial general protocol may be preset. The initial general protocol may be determined based on the position information for each of the initial bed positions, the preset initial local parameters, and the preset initial general parameters. The first primary protocol may be determined based on the single-bed protocol. The one or more subsequent primary protocols may be determined based on the single-bed protocols and the initial general parameters. The initial protocol group may be generated based on the initial general protocol, the first primary protocol, and the one or more subsequent primary protocols.

In some embodiments, the generating the target protocol group corresponding to the plurality of target bed positions by adjusting, based on the reference image, the at least one parameter of the initial protocol group may include causing at least one of the reference image, the initial protocol group, or the target protocol group to be displayed on a display.

In a second aspect of the present disclosure, a system is provided. The system may include at least one processor, and a storage device for storing instructions that, when executed by the at least one processor, cause the system to effectuate one or more operations. The one or more operations may include: obtaining a reference imaging protocol relating to an object to be imaged, wherein the object is supported on a bed; generating a reference image of the object based on the reference imaging protocol; obtaining an initial protocol group; generating a target protocol group corresponding to a plurality of target bed positions by adjusting, based on the reference image, at least one parameter of the initial protocol group, wherein the target protocol group includes a target general protocol for localizing the plurality of target bed positions and a plurality of target primary protocols for localizing each of the plurality of target bed positions; and acquiring scan data by scanning the object based on the target protocol group.

In some embodiments, the initial protocol group may include an initial general protocol. The generating the target protocol group corresponding to the plurality of bed positions by adjusting, based on the reference image, the at least one parameter of the initial protocol group may include adjusting one or more initial general parameters of the initial general protocol based on a height of the object and/or region of interest (ROI) information of the object.

In some embodiments, the initial protocol group may correspond to a plurality of initial bed positions and the one or more initial general parameters may include at least one of a first count of the plurality of initial bed positions, a combined imaging region of the plurality of initial bed positions, a imaging region for each of the plurality of initial bed positions, or an overlap region between two adjacent initial bed positions.

In some embodiments, each of the plurality of target primary protocols may include one or more local parameters. The one or more local parameters may include a protocol ID, slice group information, a slice gap, a slice thickness, an FoV (Field of View) read, an FoV phase, dimension information, overlap region information, or identification information of a bed position.

In some embodiments, the target protocol group may further include one or more target supplement protocols, each of the one or more target supplement protocols may correspond to one of the plurality of target primary protocols. The acquiring scan data by scanning the object based on the target protocol group may include for a target primary protocol corresponding to a target bed position and a target supplement protocol corresponding to the target primary protocol, acquiring first scan data by scanning the object based on the target primary protocol; and acquiring second scan data by scanning the object based on the target supplement protocol.

In some embodiments, the system may be further caused to set a control mode of the bed, wherein the control mode includes a fixed mode, an off-center mode, or a free-bed mode. In the fixed mode, a first position of the bed defined by the target supplement protocol may be the same as a second position of the bed defined by the target primary protocol, and a first slice center defined by the target supplement protocol may be the same as a second slice center defined by the target primary protocol. In the off-center mode, the first position of the bed defined by the target supplement protocol may be the same as the second position of the bed defined by the target primary protocol, and the first slice center defined by the target supplement protocol may be different from the second slice center defined by the target primary protocol. In the free-bed mode, the first position of the bed defined by the target supplement protocol may be different from the second position of the bed defined by the target primary protocol, and the first slice center defined by the target supplement protocol may be different from the second slice center defined by the target primary protocol.

In some embodiments, the system is further caused to effectuate the operations includes determining one or more imaging portions of the object; obtaining one or more single-bed position protocols corresponding to the one or more imaging portions; and generating one or more initial protocol groups based on the one or more single-bed position protocols.

In some embodiments, the generating the one or more initial protocol groups based on the one or more single-bed position protocols may include determining a second count of the one or more single-bed position protocols; and generating the one or more initial protocol groups based on whether the second count is greater than 1.

In some embodiments, the generating the one or more initial protocol groups based on the one or more single-bed position protocols may include generating the one or more initial protocol groups based on whether the one or more single-bed position protocols satisfy a preset condition.

In some embodiments, the preset condition includes at least one of the one or more single-bed position protocols share a same scanning sequence; at least two of imaging regions defined by the one or more single-bed position protocols have an overlap region; and bed positions defined by the one or more single-bed position protocols are within a range in a direction along a length of the bed.

In some embodiments, the generating the target protocol group corresponding to the plurality of target bed positions by adjusting, based on the reference image, the at least one parameter of the initial protocol group may include causing at least one of the reference image and the initial protocol group to be displayed on a display.

In a third aspect of the preset disclosure, a non-transitory computer readable medium is provided. The non-transitory computer readable medium may include executable instructions that, when executed by at least one processor, cause the at least one processor to effectuate a method for image reconstruction. The method may include one or more of the following operations: obtaining a reference imaging protocol relating to an object to be imaged; generating a reference image of the object based on the reference imaging protocol; obtaining an initial protocol group; generating a target protocol group corresponding to a plurality of target bed positions by adjusting, based on the reference image, at least one parameter of the initial protocol group, wherein the target protocol group includes a target general protocol for localizing the plurality of target bed positions and a plurality of target primary protocols for localizing each of the plurality of target bed positions; and acquiring scan data by scanning the object based on the target protocol group.

Supplement features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
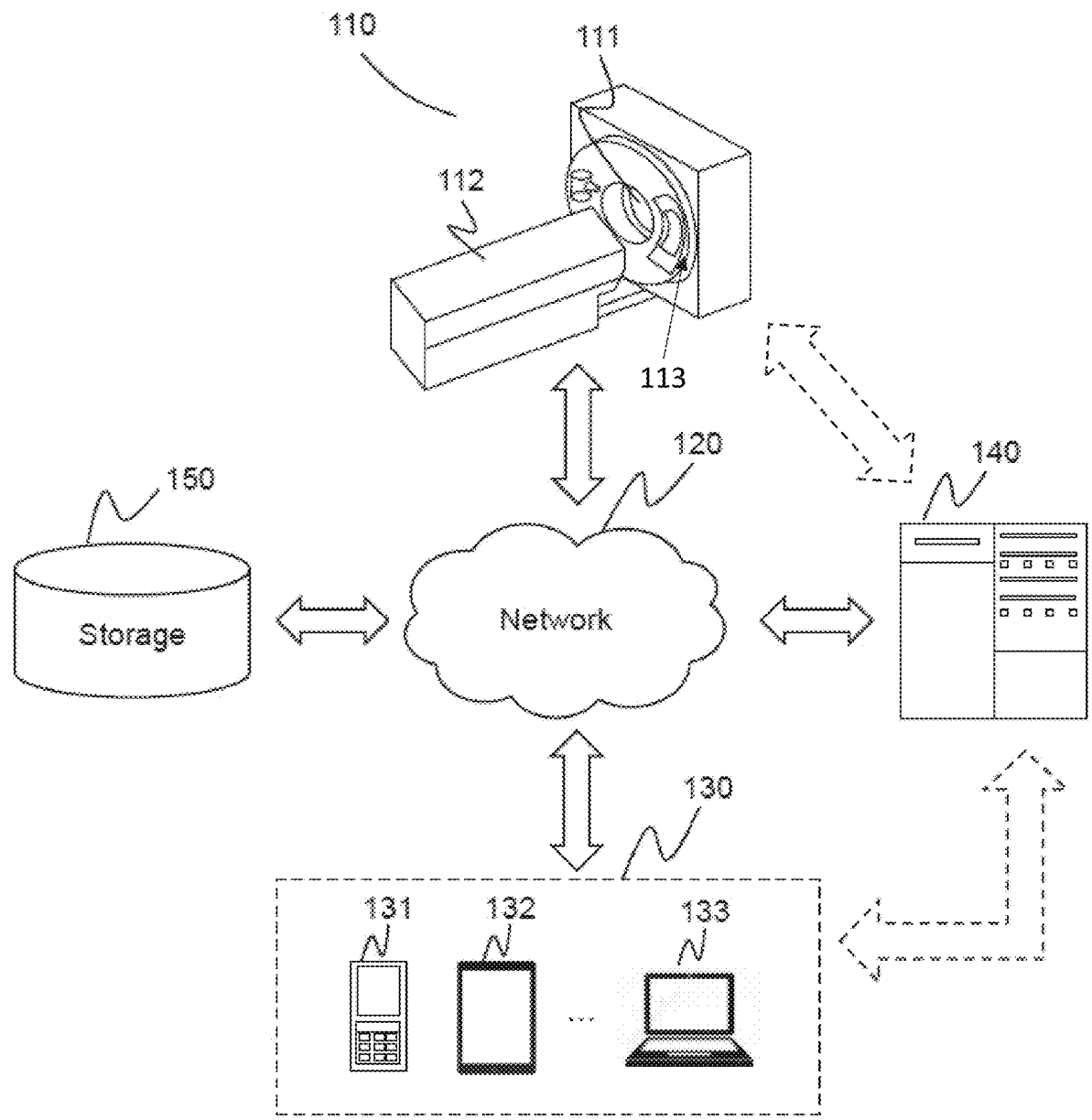
FIG. 1 is a schematic diagram of an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," "unit," and/or "block" used herein are one method to distinguish different components, elements, parts, sections, or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., CPU 220 illustrated in FIG. 2) may be provided on a computer-readable medium, such as a compact disc, a digital video disc, a flash drive, a magnetic disc, or any other tangible medium, or as a digital download (and can be initially stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when an engine, module, unit or block is referred to as being "on," "connected to," or "coupled to," another engine, module, unit or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Moreover, the system and method in the present disclosure are described primarily in regard to acquiring imaging data (or referred to as scan data) by scanning an object based on a target protocol group. In some embodiments, the target protocol group may include a target general protocol for localizing a plurality of target bed positions and a plurality of target primary protocols for localizing each of the plurality of target bed positions. The target protocol group may be generated by adjusting at least one parameter of the initial protocol group. By using the target general protocol to localize the plurality of target bed positions, a count of localization operations (e.g., generating a reference image as described in FIG. 8, parameters adjusting as described in FIG. 12) to be performed may be reduced by obviating the need to perform a scanning protocol determination followed by a localization/position of an object at each bed position as exemplified in FIG. 4, and the imaging quality of the system may be enhanced. By using the target protocol group, the parameter adjustment of the plurality of target primary protocols and workflow of the scanning may be simplified and/or efficiency may be improved.

In some embodiments, the target protocol group may further include one or more target supplement protocols. The system may be controlled to scan the object in, e.g., a fixed mode, an off-center mode, or a free-bed mode based on the one or more target supplement protocols. By allowing these modes, the scanning of the object may be more flexible and/or efficient.

FIG. 1 is a schematic diagram illustrating an exemplary imaging system 100 according to some embodiments of the present disclosure. According to the embodiment shown in FIG. 1, the imaging system 100 may include an imaging device 110, a network 120, one or more terminals 130, a processing device 140, and a storage device 150.

Figure 15:
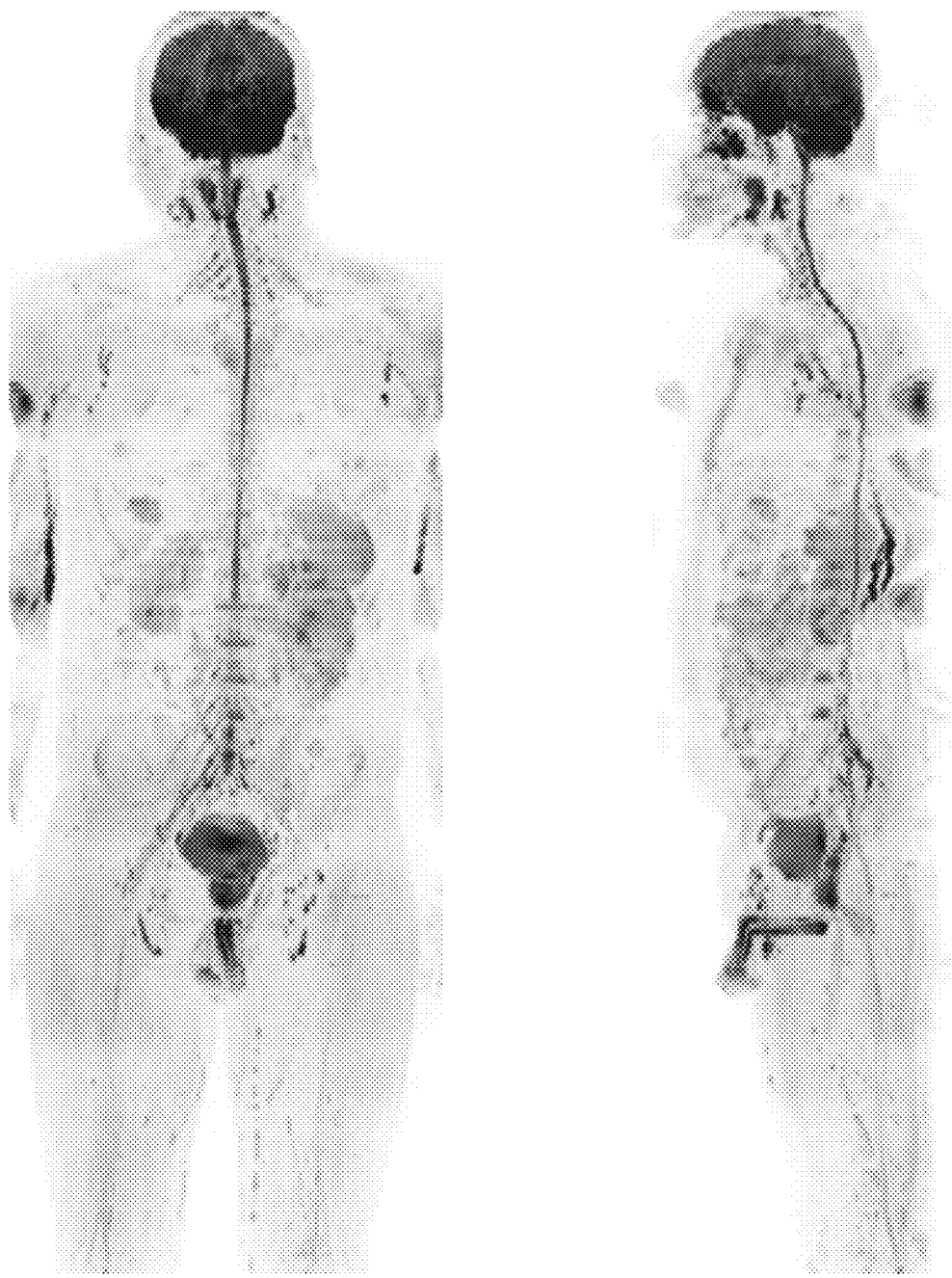
FIG. 15 is a schematic diagram illustrating an image according to some embodiments of the present disclosure.
Figure 16:
FIG. 16 is a schematic diagram illustrating an image according to some embodiments of the present disclosure.
Figure 17:
FIG. 17 is a schematic diagram illustrating an image according to some embodiments of the present disclosure.
Figure 18:
FIG. 18 is a schematic diagram illustrating an image according to some embodiments of the present disclosure.

The imaging system 100 provided in the present disclosure may be applied to any large-area scanning (e.g., a whole-body scanning) with any type of scanning protocol and any count of bed positions. Exemplary scanning that may be performed by the imaging system 100 may include whole-body diffusion-weighted imaging (WB-DWI) as shown in FIG. 15, whole-body spine imaging as shown in FIG. 16, whole body vascular imaging as shown in FIG. 17, whole body soft-tissue imaging as shown in FIG. 18, whole-body T2 weighted imaging, whole-body T1 weighted imaging, head and neck join imaging, abdominal and pelvic joint imaging, and multi-tissues/organs MRI scanning, or the like.

The imaging device 110 may scan a subject (e.g., a patient) and generate imaging data. The imaging device 110 may include a scanning cavity (also referred to as imaging area) 111, a bed 112, a scanning device 113, etc.

The scanning cavity 111 may be configured to define an imaging area. The subject lying on the bed 112 may be configured within the scanning cavity to be scanned. In some embodiments, the imaging device may include a computed tomography (CT), a cone-beam computed tomography (CBCT), an emission computed tomography (ECT), a magnetic resonance imaging (MRI), a radiotherapy (RT) device, a positron emission computed tomography (PET), or the like, or any combination thereof. In some embodiments, the imaging device 110 may include a scanning device, a control device, a decoding device, and an output device.

The scanning device 113 may scan an object (e.g., the subject lying on the bed 112) and generate imaging data. The scanning device 113 may include a scanning cavity (e.g., the scanning cavity 111) and one or more scanners (not shown in FIG. 1). The scanner(s) may be a digital subtraction angiography (DSA) scanner, a magnetic resonance angiography (MRA) scanner, a computed tomography angiography (CTA) scanner, a positron emission tomography (PET) scanner, a single-photon emission computed tomography (SPECT) scanner, a computed tomography (CT) scanner, a magnetic resonance imaging (MRI) scanner, a digital radiography (DR) scanner, a multi-modality scanner, or the like, or any combination thereof. In some embodiments, the multi-modality scanner may be a computed tomography-positron emission tomography (CT-PET) scanner, a computed tomography-magnetic resonance imaging (CT-MRI) scanner, a positron emission tomography-magnetic resonance imaging (PET-MRI) scanner, a digital subtraction angiography-magnetic resonance imaging (DSA-MRI) scanner, etc. The object may be positioned within the scanning cavity to be scanned. In some embodiments, the scanning device 113 may scan the object according to one or more scanning protocols. As used in the present disclosure, a scanning protocol may include information relating to a patient (e.g., a name, a gender, an age, a height, a weight), a medical record of the object (e.g., a patient), a scanning type (e.g., CT scanning, MRI scanning, PET scanning, more particularly, PET scanning of head, MRI scanning of chest), and one or more scanning parameters. The one or more scanning parameters may be one or more general parameters (e.g., a scanning direction, a scanning order, a count of bed positions, an overlap region between two adjacent bed positions) and one or more local parameters (e.g., a protocol ID, slice group information, a slice gap, a slice thickness, an FoV (Field of View) read, an FoV phase, dimension information (e.g., 2D, 3D, 4D), identification information of a bed position, an acquisition time for a bed position, a scanning sequence). Some examples of the scanning sequence may include a fast echo (FSE) sequence, a turbo spin-echo (TSE) sequence, a spin-echo (SE) sequence, a gradient recalled echo (GRE) sequence, a field echo (FE) sequence, an inversion recovery (IR) sequence, or the like. Further, the scanning protocol may also include information of the scanning device 113, information of the processing device 140, information relating the bed 112, or any other information. The information of a device (e.g., the scanning device 113, the processing device 140, the bed 112) may refer to information that can identify the device, for example, an identifier, a name, a serial number of the device. The one or more scanning protocols may include a single-bed position protocol, a multi-bed position protocol, a reference image protocol, a general protocol, a primary protocol, a supplement protocol, and/or a protocol group (e.g., an initial protocol group, a target protocol group). The one or more scanning protocols may include a DSA protocol, an MRA protocol, a CTA protocol, a PET protocol, a SPECT protocol, a DR protocol, an MRI protocol, a PET-MRI protocol, a CT protocol, a CT-PET protocol, a DSA-MRI protocol, etc.

The imaging device 110 may work in a single-bed mode or a multi-bed mode. The single-bed mode may be selected to scan an object at a particular bed position (e.g., a head bed position, a neck bed position) and the multi-bed mode may be selected to perform a large axial field-of-view (e.g., the whole body of an object) imaging by scanning the object at more than one bed positions. For example, there may be 5 bed positions in the multi-bed mode, such as a head/neck bed position, a thorax bed position, an abdomen bed position, a pelvis bed position, and a lower leg bed position. For another example, a sixth bed position, for example, an upper leg bed position, may be employed in the multi-bed mode. In the multi-bed mode, all of the plurality of bed positions or part of the plurality of bed positions (e.g., the head/neck bed position and the thorax bed position) may be used for scanning. In some embodiments, for the bed 112 covered in a plurality of bed positions, there may be a gap or overlap of a size between bed positions. The size of the gap or overlap may vary from zero to any positive number (e.g., 1 millimeter, 2 cm, 5 cm). The length of an imaging region corresponding to each of at least some of the plurality of bed positions may be adjustable. The width of an imaging region corresponding to each of at least some of the plurality of bed positions may be adjustable. In some embodiments, the lengths of imaging regions corresponding to at least two of the plurality of bed positions may be the same. In some embodiments, the lengths of at least two of the plurality of bed position may be different. As used in the present disclosure, a length of an imaging region of a bed position may be in a direction along a length of the bed along which an object supported on the bed is moved into or out of the imaging device 110. As used herein, the width of an imaging region of the bed position may be in a direction perpendicular to the length of the bed and define the horizontal plane with the length of the bed.

In some embodiments, the imaging device 110 may obtain one or more scanning protocols from the storage device 150 and/or the processing device 140. In some embodiments, the imaging device 110 may scan the object and generate imaging data according to one or more scanning protocols. In some embodiments, the processing device 140 may obtain imaging data from the imaging device 110 via the network 120. The network 120 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™. In some embodiments, the terminal(s) 130 may be part of the processing device 140.

The processing device 140 may generate one or more scanning protocols to control the imaging device 110 to generate imaging data and process the imaging data generated by the imaging device 110. In some embodiments, the processing device 140 may generate the one or more scanning protocols based on one or more single-bed protocols stored in the processing device 140 or retrieved from the storage device 150 or the imaging device 110 via the network 120. In some embodiments, the processing device 140 may cause the imaging device 110 to conduct one or more operations. For example, the processing device 140 may cause the imaging device 110 to obtain one or more scanning protocols, scan the object according to the one or more scanning protocols, and generate imaging data based on the scanning operations. In some embodiments, the processing device 140 may reconstruct an image based on the imaging data.

In some embodiments, the processing device 140 may be a client, a single server, or a server group. The server group may be centralized or distributed. In some embodiments, the processing device 140 may be local or remote from other components in the imaging system 100. Alternatively, the processing device 140 may be directly, instead of via the network 120, connected to the imaging device 110, the terminal 130 and/or the storage. In some embodiments, the processing device 140 may be implemented on a cloud platform to perform processing. For example, the processing device 140 may be implemented on the cloud platform to detect whether a collision between a component of the imaging device 110 and a subject, adjust the geometry of the imaging device 110, perform trajectory planning, or the like, or a combination thereof. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2.

The storage device 150 may store information, data, instructions, and/or any other information. In some embodiments, the storage device 150 may store a plurality of scanning protocols. The plurality of scanning protocols may be preset protocols or generated by the processing device 140. In some embodiments, the storage device 150 may store bed position information. In some embodiments, the storage device 150 may store imaging data obtained from the imaging device 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the imaging system 100 (e.g., the imaging device 110, the processing device 140, the terminal 130). One or more components of the imaging system 100 may access the information or instructions stored in the storage device 150 via the network 120. In some embodiments, the storage device 150 may be directly connected to or communicate with one or more other components of the imaging system 100 (e.g., the processing device 140, the terminal 130). In some embodiments, the storage device 150 may be part of the processing device 140.

Figure 2:
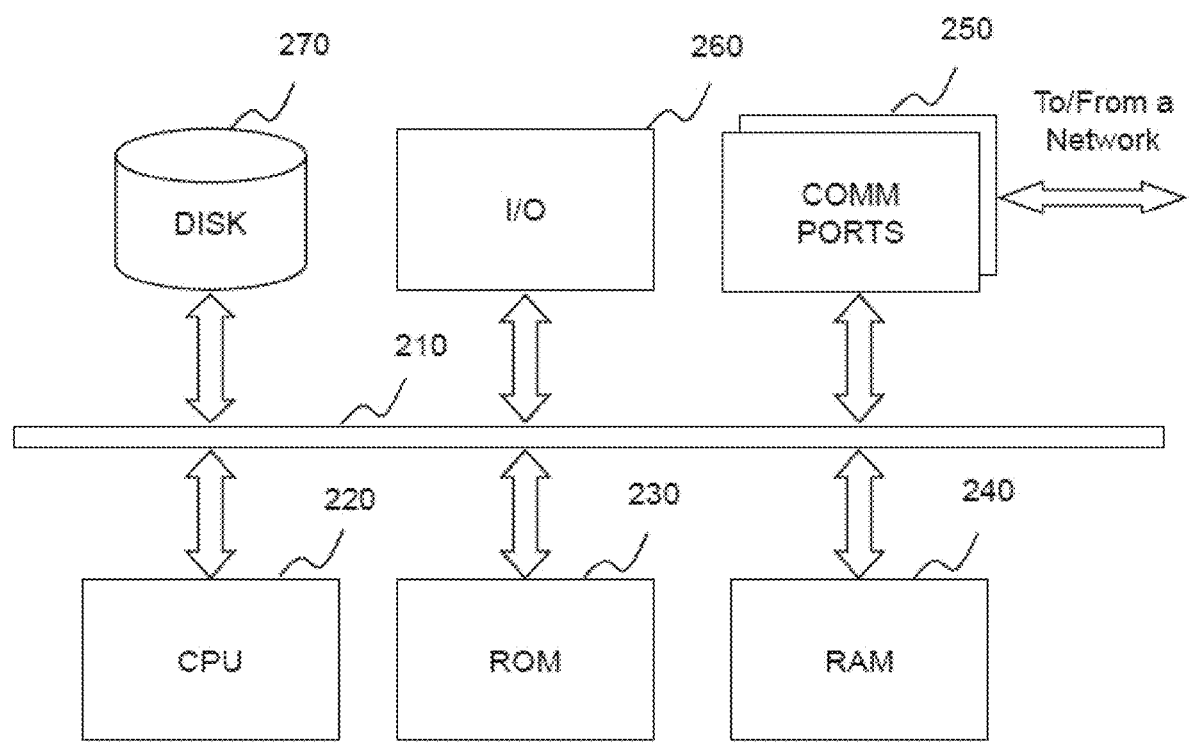
FIG. 2 is a schematic diagram of an exemplary computing device on which the imaging system can be implemented, according to some embodiments of the present disclosure.

FIG. 2 is a schematic diagram illustrating an exemplary computing device 200 on which the imaging system 100 can be implemented, according to some embodiments of the present disclosure.

The computing device 200 may be a general-purpose computer or a special purpose computer. Both may be used to implement an imaging system of the present disclosure. The computing device 200 may be used to implement any component of the service as described herein. For example, one or more components of the imaging device 110 and the processing device 140 of the imaging system 100 may be implemented on the computing device 200, via its hardware, software program, firmware, or a combination thereof. Although only one such computer is shown for convenience, the computer functions related to the imaging system 100 as described herein may be implemented in a distributed manner on a number of similar platforms to distribute the processing load.

The computing device 200, for example, may include COMM ports 250 connected to and from a network (e.g., the network 120) connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random-access memory (RAM) 240, for various data files to be processed and/or transmitted by the computer. The exemplary computer platform may also include program instructions stored in the ROM 230, the RAM 240, and/or other types of non-transitory storage medium to be executed by the CPU 220. The methods and/or processes of the present disclosure may be implemented as the program instructions. The computing device 200 also includes an I/O 260, supporting input/output between the computer and other components therein. In some embodiments, the I/O 260 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof. For example, the I/O 260 may be a display for displaying an image generated by the processing device 140. As another example, the I/O 260 may be an input device to be configured to receive a parameter adjustment input by a user. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 executes both steps A and step B. As in another example, step A and step B may also be performed by two different CPUs and/or processors jointly or separately in the computing device 200 (e.g., the first processor executes step A, and the second processor executes step B; or the first and second processors jointly execute steps A and B).

Figure 3:
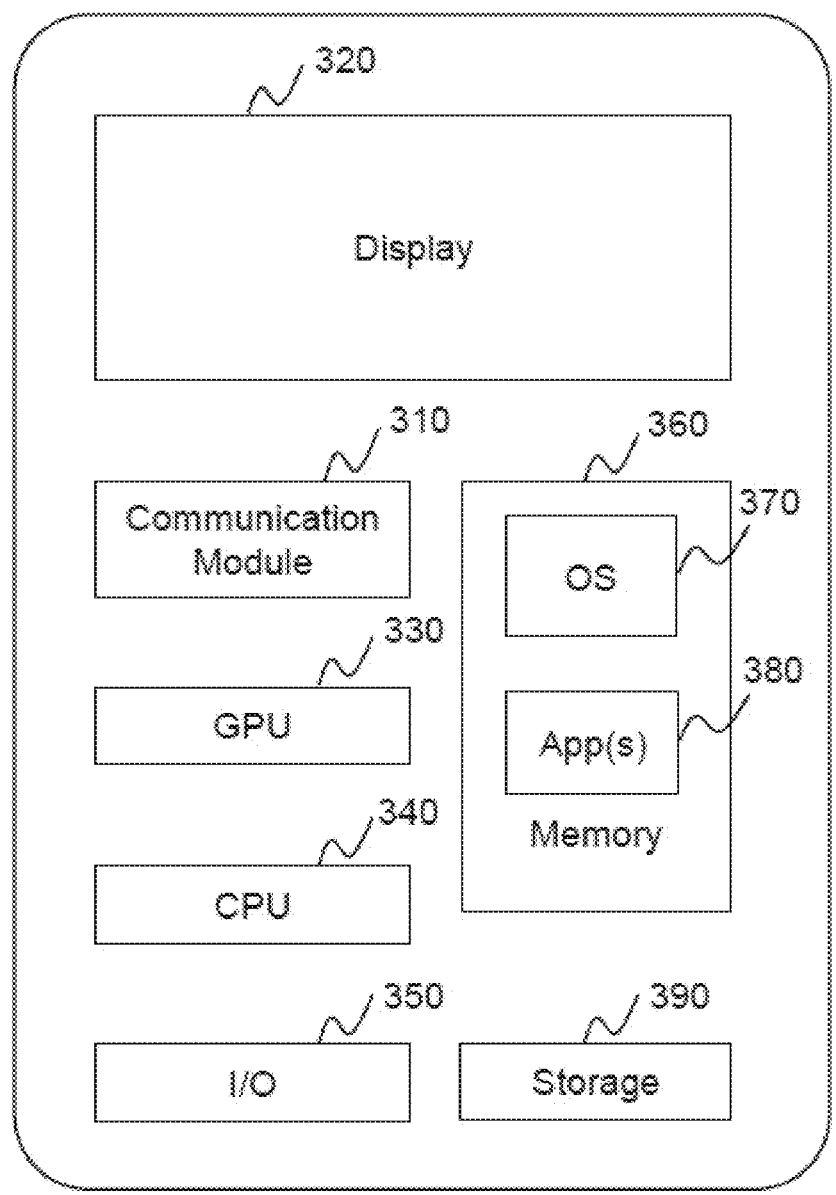
FIG. 3 is a schematic diagram of exemplary hardware and/or software components of an exemplary mobile device on which the terminal may be implemented according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication module 310, a display 320, a graphics processing unit (GPU) 330, a central processing unit (CPU) 340, an I/O 350, a memory 360, and a storage device 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage device 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
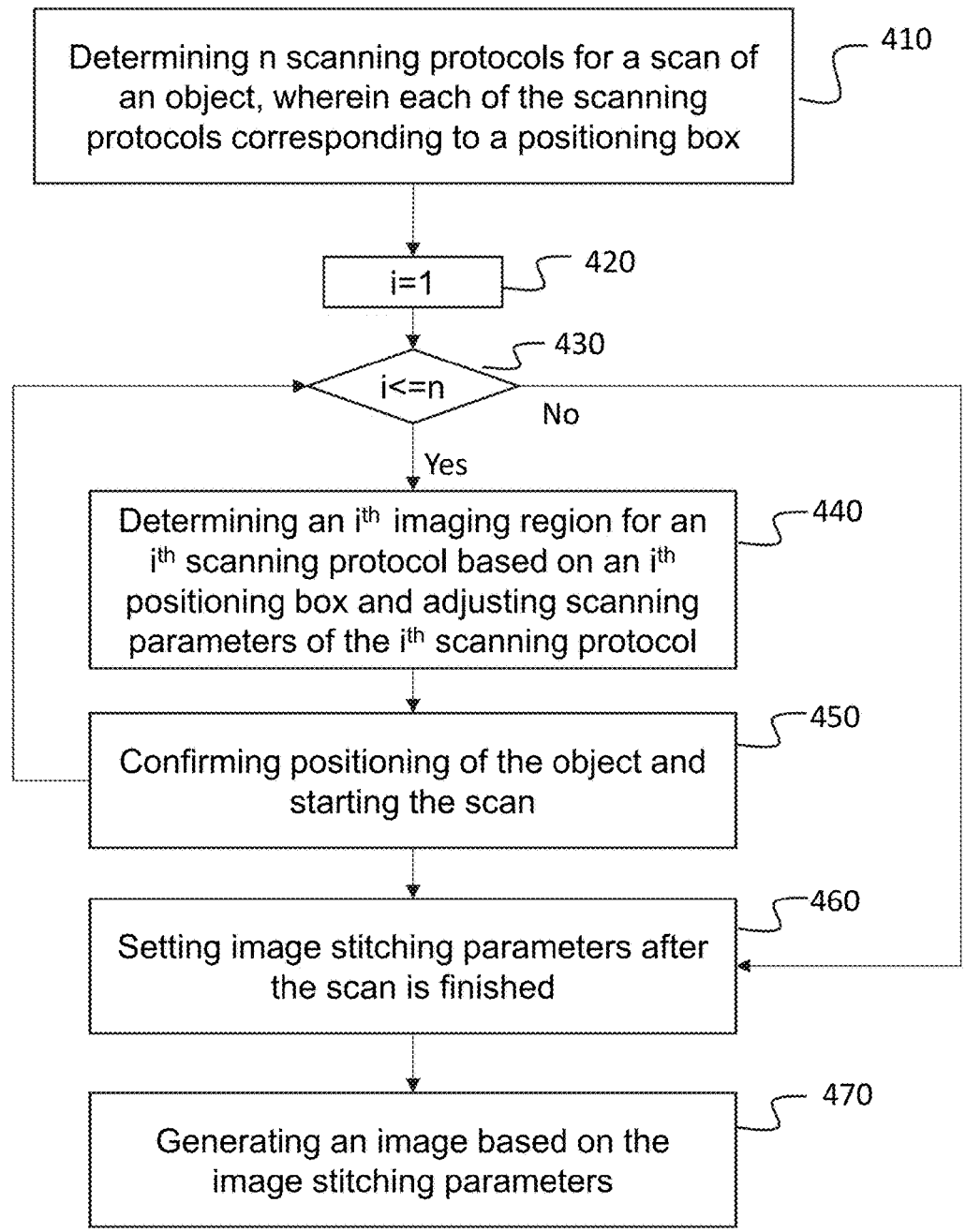
FIG. 4 is a flowchart of an exemplary scanning process according to prior art.

FIG. 4 is a flowchart of an exemplary scanning process 400 according to prior art. The scanning process 400 may be implemented in an MRI device for scanning an object.

In 410, n scanning protocols may be determined for a scan of an object. Each of the n scanning protocols may correspond to a positioning box. The positioning box may be configured to locate an imaging region in a human-computer interface. In 420, a first scanning protocol may be selected and then in 430-460 the scan may be performed repeatedly until the scan based on all of the n scanning protocols is finished. In 440, an $i^{th}$ imaging region for an $i^{th}$ scanning protocol may be determined based on an $i^{th}$ positioning box, and scanning parameters of the $i^{th}$ scanning protocol may be adjusted. In 450, positioning of the object may be confirmed and the scan may be started. In 460, image stitching parameters may be set after the scan is finished. As used herein, that the scan is finished may mean all the n scanning protocols have been performed. In 470, an image may be generated base on the image stitching parameters and data acquired in process 400. In process 400, it may be a loop control variable to control the scan. In each loop operation, imaging region localization and scanning parameter adjustment may need to be performed once. The complex imaging region localization and scanning parameter adjustment may lead to a huge manpower consumption, and/or between loops may be pauses to switch scanning protocols. Even if the n imaging region localizations and scanning parameter adjustments are performed for the n scanning protocols, a position deviation may exist and/or accumulate in the imaging data generated in process 400 for each scanning protocol which may lead to an inferior stitching effect or quality. In some situations, the imaging data generated in process 400 for the n scanning protocols may not be stitched due to some parameter error in the n imaging region localizations.

Figure 5:
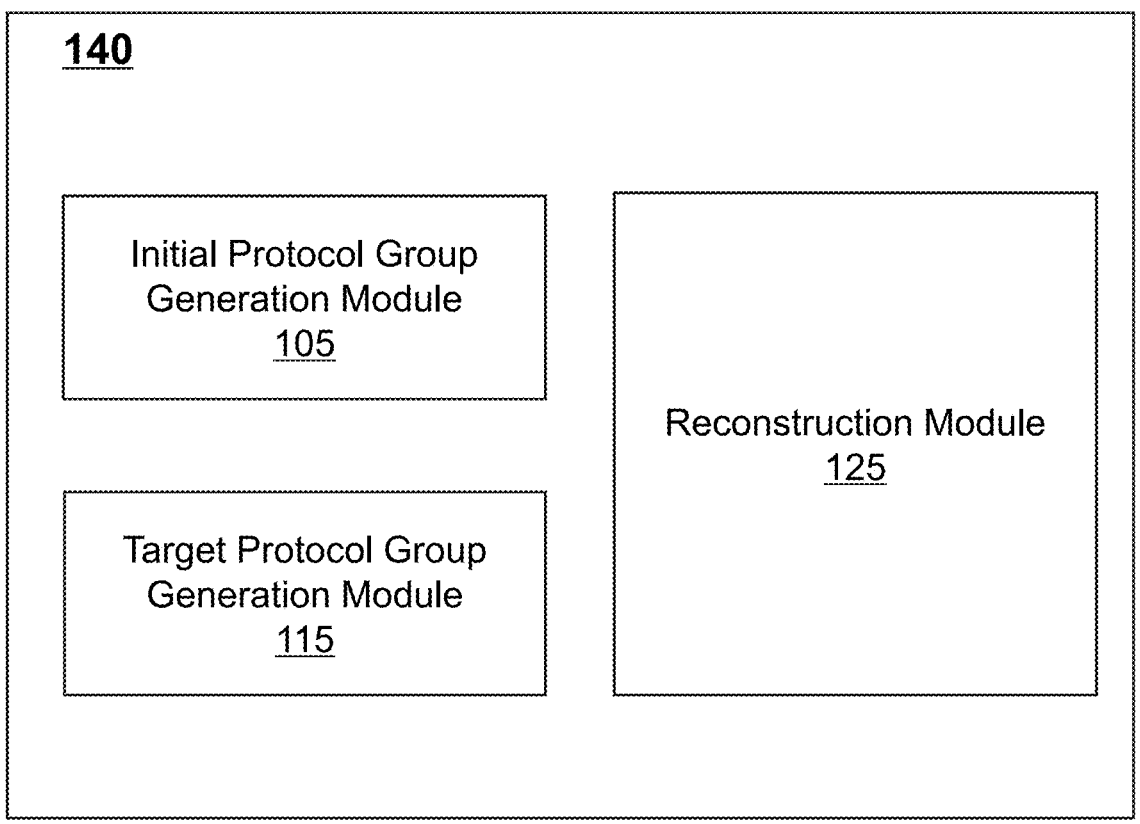
FIG. 5 is a block diagram illustrating an exemplary processing device according to some embodiments of the present disclosure.

FIG. 5 is a block diagram illustrating an exemplary processing device 140 according to some embodiments of the present disclosure. The processing device 140 may include an initial protocol group generation module 105, a target protocol group generation module 115, and a reconstruction module 125. One or more components of the processing device 140 may be implemented on various components (e.g., the CPU 220 of the computing device 200 illustrated in FIG. 2). More or fewer components may be included in the imaging device 110 without loss of generality. For example, two of the devices may be combined into a single device, or one of the devices may be divided into two or more devices.

The initial protocol group generation module 105 may generate one or more initial protocol groups. As used in the present disclosure, an initial protocol group may be a set of scanning protocols that include an initial general protocol and at least two initial primary protocols. In some embodiments, the initial protocol group may further include one or more initial supplement protocols. The initial protocol group may be used to generate a target protocol group. The one or more initial protocol groups may be generated based on information of an object (e.g., one or more imaging portions of the object, a height of the object, a region of interest (ROI) of the object), one or more single-bed position protocols, a count M of initial bed positions, etc. More descriptions regarding the generation of the one or more initial protocol groups may be found elsewhere in the present disclosure. See, e.g., FIGS. 9-11 and relevant descriptions thereof.

The target protocol group generation module 115 may generate one or more target protocol groups. As used in the present disclosure, a target protocol group may be a set of scanning protocols that include a target general protocol, at least two target primary protocols. In some embodiments, the target protocol group may further include one or more target supplement protocols. The target protocol group may be used as a scanning protocol according to which the imaging device 110 may scan an object. For example, the bed 112 may be moved from a first position to a second position in a scan based on the target protocol group. As another example, the scanning device 113 may turn based on the target protocol group. The one or more target protocol groups may be generated based on one or more initial protocol groups, information of an object (e.g., one or more imaging portions of the object, a height of the object, an ROI of the object), information input by a user (e.g., a doctor), etc. More descriptions regarding the generation of the one or more target protocol groups may be found elsewhere in the present disclosure. See, e.g., FIG. 12 and relevant descriptions thereof.

Figure 14:
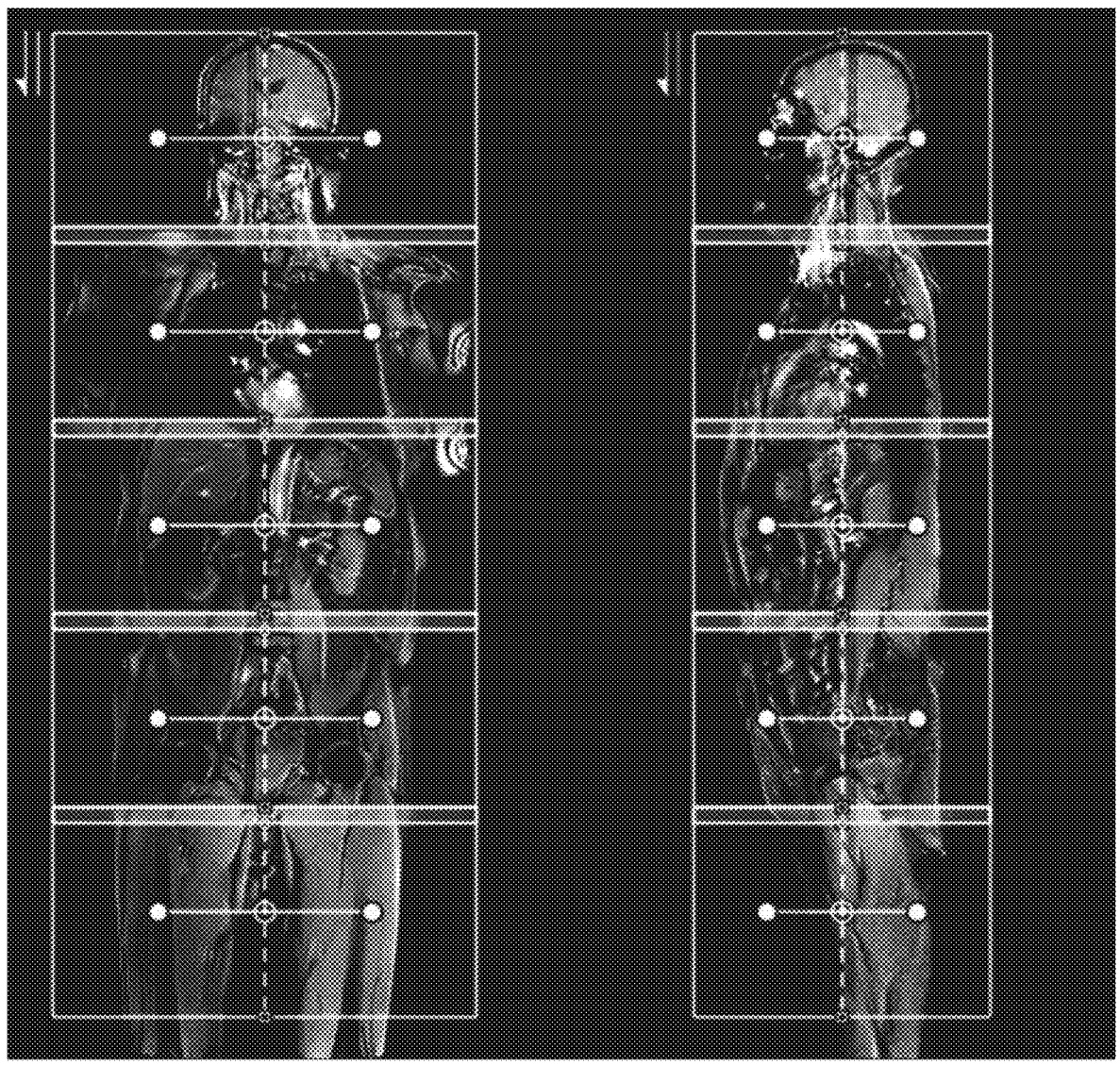
FIG. 14 is a schematic diagram illustrating a reference image according to some embodiments of the present disclosure.

The reconstruction module 125 may perform image reconstruction operation and generate a reconstruction image based on imaging data acquired by the imaging device 110. The reconstruction image may be a 4D reconstruction image, a 3D reconstruction image, or a 2D reconstruction. The reconstruction image may be an MRI image, a PET image, a CT image, a SPECT image, a computed tomography colonography image (CTC image), etc. The reconstruction image may be a grayscale image, an RGB image, or a binary image. The reconstruction image may be a reference image, such as an image for guiding a protocol generating process as shown in FIG. 14. The reconstructed image generated by the reconstruction module 125 may be sent to other component(s) in the processing device 140, for example, a display module (not shown in FIG. 5), or the like, or a combination thereof. The reconstruction image may be sent to one or more components in the imaging system 100, for example, the imaging device 110, the network 120, terminals 130, the storage device 150, or the like, or a combination thereof.

It should be noted that the above description of the processing device 140 is merely provided for the purposes of illustration, and not intended to limit the scope of the present disclosure. For persons having ordinary skills in the art, multiple variations and modifications may be made under the teachings of the present disclosure. For instance, the assembly and/or function of the processing device 140 may be varied or changed according to specific implementation scenarios. Merely by way of example, some other components may be added into the processing device 140, such as a position label setting module, a display module, a control module, an image/data output module, and other modules. The control module may be configured to generate one or more control signals for controlling a scanning of the imaging system 100. The one or more control signals may be determined based on the initial protocol group and/or the target protocol group.

Figure 6:
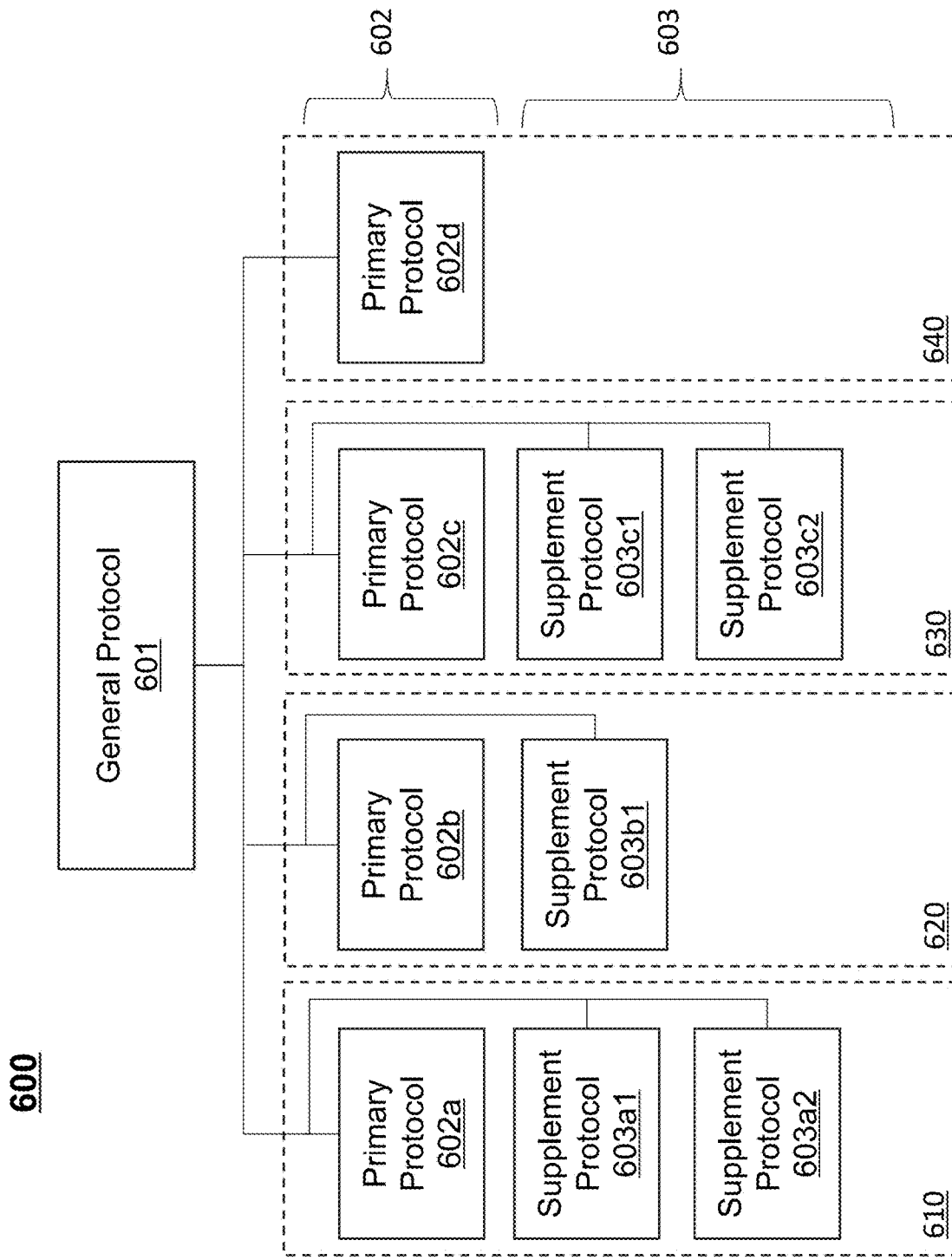
FIG. 6 is a schematic diagram illustrating an exemplary protocol group 600 according to some embodiments of the present disclosure.

FIG. 6 is a schematic diagram illustrating an exemplary protocol group 600 according to some embodiments of the present disclosure.

The protocol group 600 may include a general protocol 601 and a plurality of primary protocols 602 (e.g., 602a, 602b, 602c, and 602d). In some embodiments, the protocol group 600 may further include one or more supplement protocols 603 (e.g., 603a1, 603a2, 603b1, 603c1, and 603c2). Each of the plurality of primary protocols 602 and the one or more supplement protocols 603 may correspond to a bed position, such as 610, 620, 630, and 640. For instance, the primary protocol 602a, the supplement protocol 603a1, and the supplement protocol 603a2 may correspond to the bed position 610. As another example, the primary protocol 602b and the supplement protocol 603b1 may correspond to the bed position 620. As a further example, the primary protocol 602c, the supplement protocol 603c1, and the supplement protocol 603c2 may correspond to the bed position 630. As still a further example, the primary protocol 602d may correspond to the bed position 640.

Figure 13:
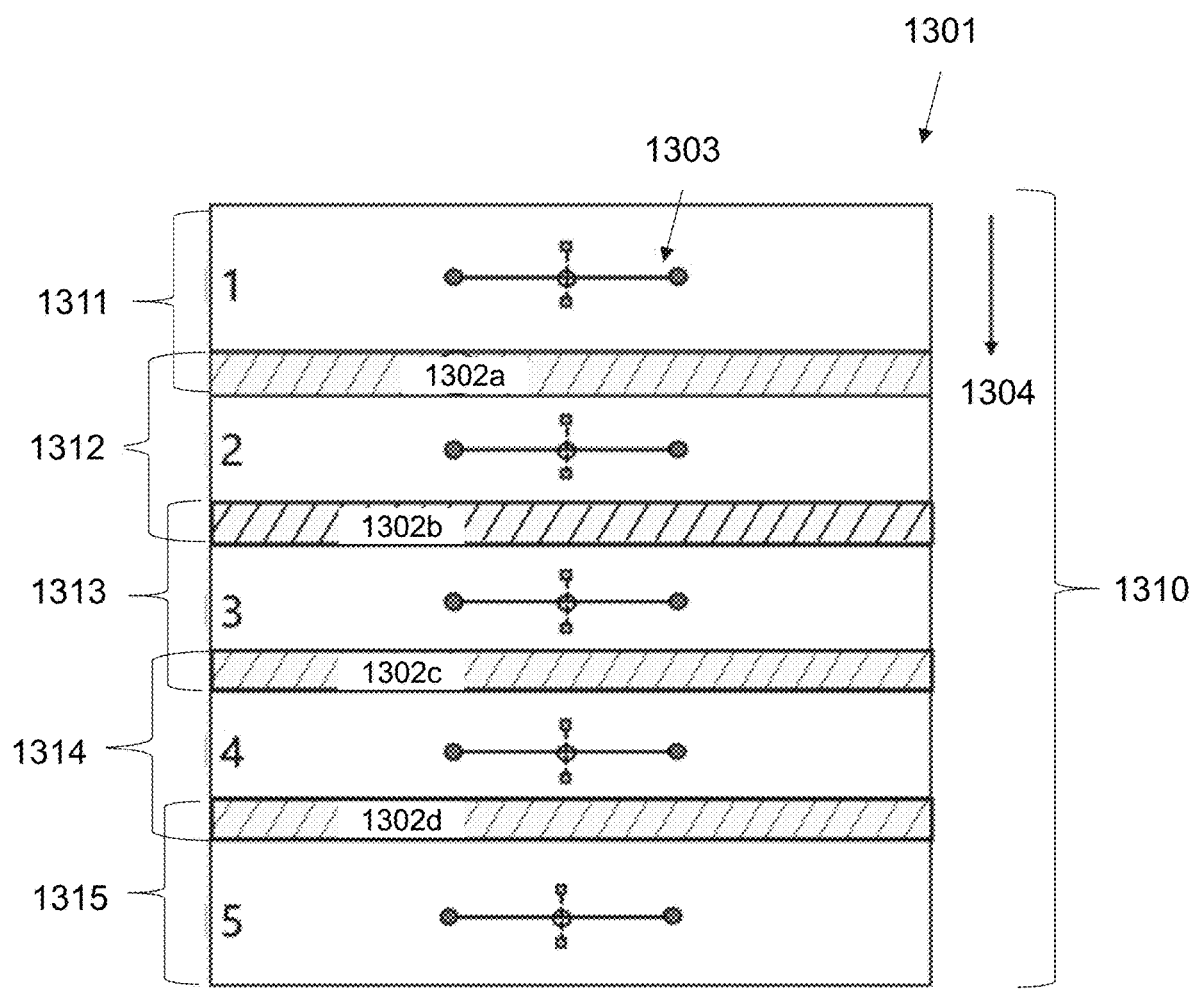
FIG. 13 is a schematic diagram illustrating an exemplary interface according to some embodiments of the present disclosure.

The general protocol 601 may be configured to control a general localization of a plurality of bed positions for scanning. For example, the general protocol 601 may be configured to determine a combined imaging region 1310 as shown in FIG. 13. Each of the plurality of primary protocols 602 may be configured to control a single-bed localization of each of the plurality of bed positions for scanning. In some embodiments, a primary protocol may be used to control a gradient distribution for scanning of an object with an MRI device. For example, the gradient distribution may be achieved by determining a slice-select gradient, a phase encoding gradient, and a readout gradient, or the like, or a combination thereof. The general protocol 601 may be a general protocol in the protocol group 600, which may include general parameters for localizing a plurality of bed positions, for example, a scanning direction, a scanning order, a count of bed positions, an overlap region between two adjacent bed positions, a combined imaging region, or the like, or a combination thereof. The general protocol 601 may further include local parameters, which may also be included in each of the plurality of primary protocols 602, for localizing each of the plurality of bed positions. The general protocol 601 may be associated with each of the plurality of primary protocols 602 through the local parameters. As used in the present disclosure, associating two protocols, e.g., protocol A with protocol B, may mean establishing a dependency relationship or correlation between A and B. For example, if local parameters included in a primary protocol 602 (e.g., 602a, 602b, 602c, and 602d) are changed, corresponding local parameters included in the general protocol 601 may also be changed accordingly. The local parameters may include a protocol ID, slice group information, a slice gap, a slice thickness, an FoV (Field of View) read, an FoV phase, dimension information, a count of slices, overlap region information, identification information of a bed position, or the like, or a combination thereof.

In some embodiments, each of the plurality of primary protocols 602 may be attached with one or more supplement protocols 603. The attached one or more supplement protocols 603 may be supplement protocols to the plurality of primary protocols 602 for scanning an object at the same bed position. For example, a primary protocol 602a may correspond to a bed position 610 and be attached with supplement protocols 603a1 and 603a2. In some embodiments, a primary protocol 602d may correspond to a bed position 640 and no supplement protocol attached. Each of the plurality of primary protocols 602 may be configured to control a single-bed localization of a bed position for the scanning at that bed position. The one or more supplement protocols 603 may be determined based on a clinical requirement relating to a particular bed position. For example, for a spine bed position scanning, a lesion may be found in a sagittal plane scanning, and a coronal plane scanning may be performed based on a primary protocol. In order to see more details of the lesion, a transverse plane scanning of an intervertebral disc or a vertebra may be performed at the spine bed position as a supplement protocol to make a supplement scanning. In some embodiment, one supplement protocol may be supplemented to a bed position. In some embodiments, more than one supplement protocols may be supplemented to a bed position.

In some embodiments, under controlling of the one or more supplement protocols 603, the imaging device 110 may work in one or more control modes, for example, a fixed mode, an off-center mode, or a free-bed mode. The following descriptions takes the supplement protocol 603b1, the primary protocol 602b, and its corresponding bed position 620 as an example to explain the one or more control modes.

In the fixed mode, a first position of a bed defined by the supplement protocol 603b1 (e.g., a target supplement protocol) may be the same as a second position 620 of the bed defined by the corresponding primary protocol 602b (e.g., a target primary protocol), and a first slice center defined by the supplement protocol 603b1 (e.g., a target supplement protocol) may be the same as a second slice center defined by the corresponding primary protocol 602b (e.g., a target primary protocol). Working in the fixed mode, between a scanning controlled by the corresponding primary protocol 602b and a subsequent scanning controlled by the supplement protocol 603b1, the bed 112 may remain at the same position.

In the off-center mode, a first position of a bed defined by the supplement protocol 603b1 (e.g., a target supplement protocol) may be the same as a second position 620 of the bed defined by the corresponding primary protocol 602b (e.g., a target primary protocol), and a first slice center defined by the supplement protocol 603b1 (e.g., a target supplement protocol) may be different from a second slice center defined by the corresponding primary protocol 602b (e.g., a target primary protocol). Working in the off-center mode, between a scanning controlled by the corresponding primary protocol 602b and a subsequent scanning controlled by the supplement protocol 603b1, the bed 112 may remain at the same position.

In the free-bed mode, a first position of a bed defined by the supplement protocol 603b1 (e.g., a target supplement protocol) may be different from a second position of the bed defined by the corresponding primary protocol 602b (e.g., a target primary protocol), and a first slice center defined by the supplement protocol 603b1 (e.g., a target supplement protocol) may be different from a second slice center defined by the corresponding primary protocol 602b (e.g., a target primary protocol). Working in the free-bed mode, between a scanning controlled by the corresponding primary protocol 602b and a subsequent scanning controlled by the supplement protocol 603b1, the bed 112 may be moved based on the supplement protocol 603b1. Under such a control mechanism, a more flexible scanning may be achieved.

The protocol group 600 may include an initial protocol group and a target protocol group. The initial protocol group may be configured to determine the target protocol by adjusting one or some parameters. The target protocol group may be configured to control scanning performed by the imaging system 100. For example, based on the target protocol group a patient may be scanned to generate one or more images. The initial protocol group and the target protocol group may share the same structure as described in FIG. 6.

Figure 7A:
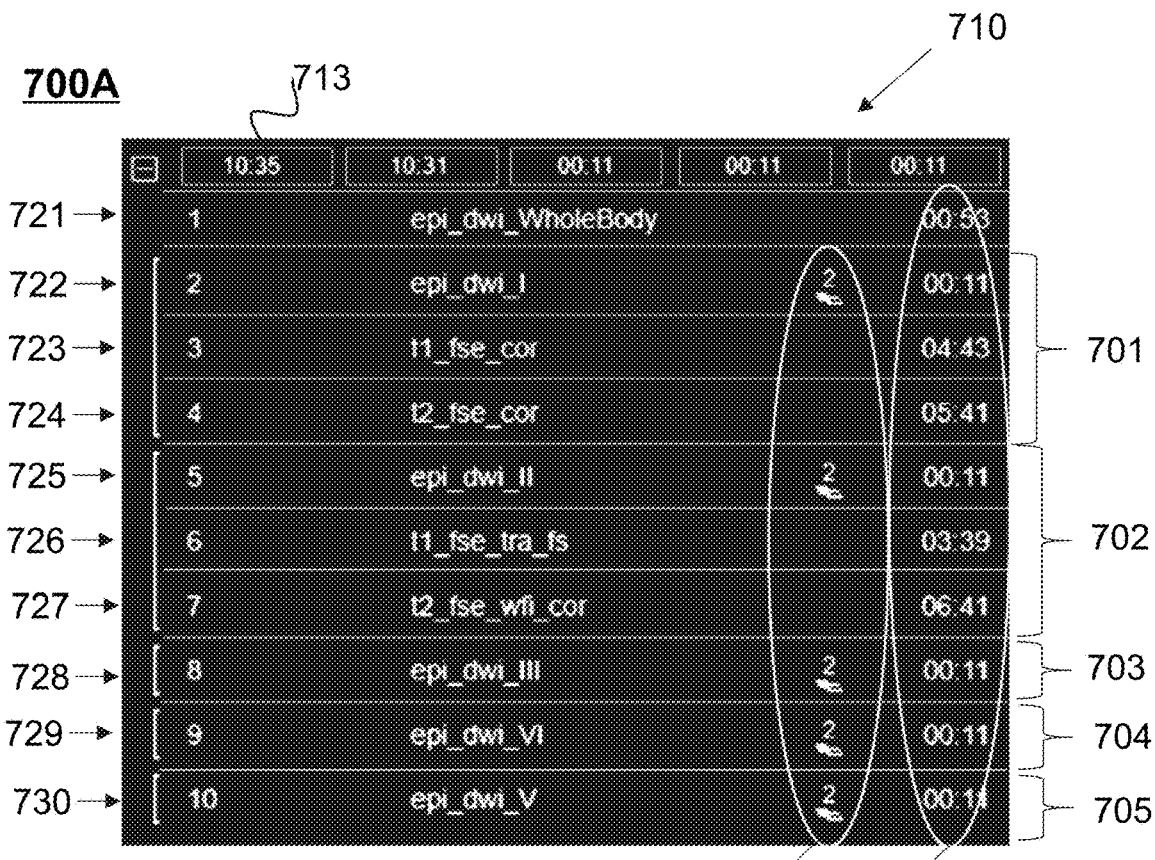
FIGS. 7A and 7B are schematic diagrams illustrating exemplary interfaces according to some embodiments of the present disclosure.
Figure 7B:
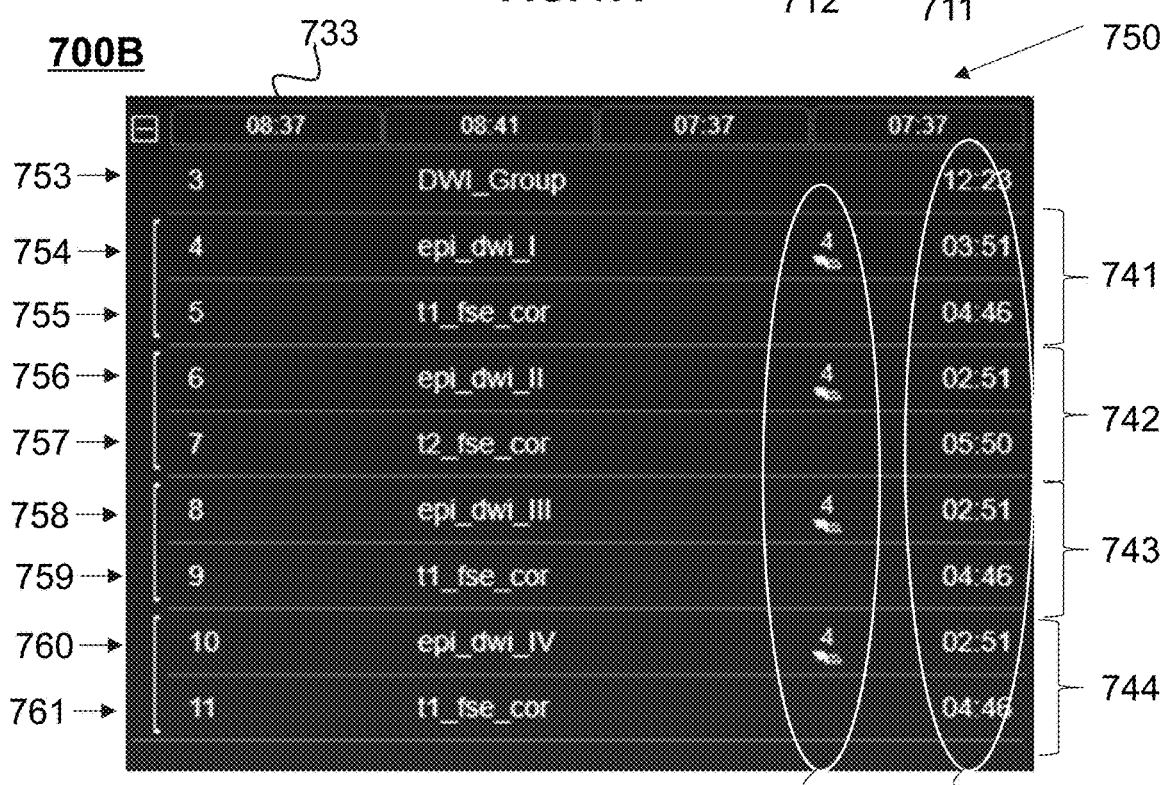

FIGS. 7A and 7B are schematic diagrams illustrating exemplary interfaces 700A and 700B according to some embodiments of the present disclosure. The interface 700A may be used to display some information of a protocol group 710 and the interface 700B may be used to display some information of a protocol group 750. The protocol group 710 and the protocol group 750 may be an initial group or a target group. In some embodiments, the interfaces 700A and 700B may be configured to an editing window for adding or deleting a bed position or adjusting some other parameters of a protocol group.

As shown in FIG. 7A, the protocol group 710 displayed in the interface 700A may include a general protocol 721, primary protocols 722, 725, 728, 729, and 730, and supplement protocols 723, 724, 726, and 727. The protocol group 710 may correspond to bed positions 701, 702, 703, 704, and 705. The primary protocol 722 may correspond to the bed position 701, and there may be two supplement protocols 723, 724 corresponding to the same bed position. In the interface 700A, the scanning time for each of the bed positions may also be provided in region 711. For example, the scanning time of the primary protocol 722 may be 00:11 (i.e. 11 seconds), the scanning time of the supplement protocol 723 may be 04:43 (i.e. 4 minutes and 43 seconds), and the scanning time of the supplement protocol 724 may be 05:41 (i.e. 5 minutes and 41 seconds) as shown in the region 711, and a combined scanning time for the bed position 701 then may be 10:35 (i.e. 10 minutes and 35 seconds) as shown in the region 713. Numbers in region 712 may indicate image stitching parameters for protocols corresponding to each of the bed positions. More details of the general protocol 721 may be displayed in an interface as shown in FIG. 13.

As shown in FIG. 7B, the protocol group 750 displayed in the interface 700B may include a general protocol 753, primary protocols 754, 756, 758, and 760, and supplement protocols 755, 757, 759, and 761. The protocol group 750 may correspond to bed positions 741, 742, 743, and 744. Numbers in region 732 may indicate image stitching parameters for protocols corresponding to each of the bed position.

Numbers in region 731 may indicate the scanning time for each protocol group. Numbers in region 733 may indicate the combined scanning time for a bed position.

It should be noted that the above description of the interface is merely provided for the purposes of illustration, and not intended to limit the scope of the present disclosure. For persons having ordinary skills in the art, multiple variations and modifications may be made under the teachings of the present disclosure. For example, interfaces 700A and 700B may further display a scanning sequence, an imaging region of each protocol, or the like, or a combination thereof. As another example, scanning time information may be displayed in another region or form. Such variations and modifications do not depart from the scope of the present disclosure.

Figure 8:
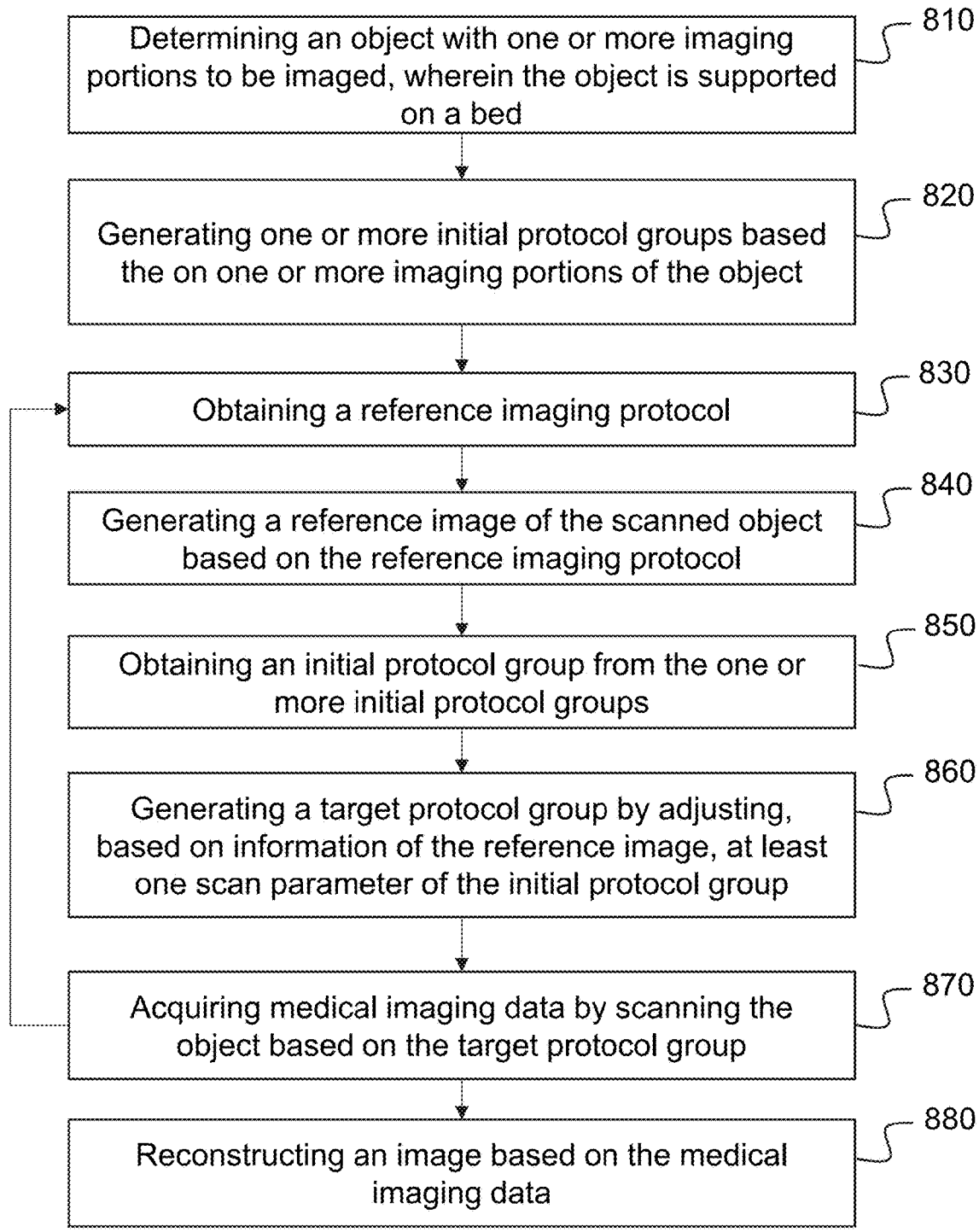
FIG. 8 is a flowchart illustrating an exemplary process of scanning an object according to some embodiments of the present disclosure.

FIG. 8 is a flowchart illustrating an exemplary process 800 of scanning an object according to some embodiments of the present disclosure. In some embodiments, one or more operations of the process 800 illustrated in FIG. 8 may be implemented in the imaging system 100 illustrated in FIG. 1. For example, the process 800 illustrated in FIG. 8 may be stored in the storage device 150 in the form of instructions, and invoked and/or executed by the processing device 140 (e.g., the processor of a computing device). As another example, a portion of the process 800 may be implemented on the scanning device 113.

In 810, an object with one or more imaging portions to be imaged may be determined. The object may be supported on a bed, e.g., the bed 112 as shown in FIG. 1.

In 820, one or more initial protocol groups may be generated based on the one or more imaging portions of the object. In some embodiments, operation 820 may be implemented by the initial protocol group generation module 105 of the processing device 140. The one or more imaging portions of the object may include the head, the neck, the thorax, the abdomen, the pelvis, an upper leg, a lower leg, or the like, or a combination thereof. Each of the one or more initial protocol groups may correspond to one or more imaging portions of the object or the whole body of the object. The one or more initial protocol groups generated in operation 820 may be stored in the processing device 140 or may be transmitted to any components of the imaging system 100 (e.g., the storage device 150, the one or more terminals 130) via the network 120. More descriptions regarding the generation of the one or more initial protocol groups may be found elsewhere in the present disclosure. See, e.g., FIGS. 9-11 and relevant descriptions thereof.

In 830, a reference imaging protocol may be obtained. In some embodiments, operation 830 may be implemented by the scanning device 113 of the imaging system 100. The scanning device 113 may scan an object to acquire reference imaging data based on the reference imaging protocol. The reference imaging protocol may be stored in the scanning device 113 or retrieved from any other components (e.g., the processing device 140, the storage device 150) of the imaging system 100. The reference may be obtained based on a scan type of a target protocol group (e.g., an MRI scan) or information of the object (e.g., ROI information of the object).

In 840, a reference image of the object may be generated based on the reference imaging protocol. In some embodiments, operation 840 may be implemented by the reconstruction module 125 of the processing device 140. The reference image may be as referred to as a scout image, which may be a preliminary image obtained prior to performing a scan. The reference image may be configured as a baseline for generating an initial protocol group or a initial protocol group, to make sure a region of interest is included in a field of view, or to check an exposure parameter. For example, the reference image may be used to plot locations where slice images may be obtained based on the initial protocol group.

In 850, an initial protocol group may be obtained from the one or more initial protocol groups. In some embodiments, operation 850 may be implemented by the target protocol group generation module 115 of the processing device 140. The initial protocol group may include an initial general protocol and at least two initial primary protocols. In some embodiments, the initial protocol group may further include one or more initial supplement protocols.

In 860, a target protocol group corresponding to a plurality of target bed positions may be generated by adjusting, based on information of the object, at least one parameter of the initial protocol group. In some embodiments, operation 850 may be implemented by the target protocol group generation module 115 of the processing device 140. The target protocol group may include a target general protocol and at least two target primary protocols. In some embodiments, the target protocol group may further include one or more target supplement protocols. The information of the object may include the reference image, a height of the object, ROI information of the object, outline information of the object, or the like, or a combination thereof. By adjusting at least one scanning parameter of the initial group, the target protocol group may be generated. The target protocol group may satisfy a clinical scanning requirement corresponding to the object.

In 870, imaging data may be acquired by scanning the object based on the target protocol group. In some embodiments, operation 870 may be implemented by the scanning device 113 of the imaging system 100. The imaging data acquired in the operation 870 may be stored in the scanning device 113 or transmitted to any components of the imaging system 100 via the network 120.

In some embodiments, if a count of the one or more initial protocol groups in operation 820 is greater than 1, operations 830-870 may repeat until a target protocol group has been generated corresponding to each of the one or more initial protocol groups. The count of the one or more initial protocol groups may be determined based on one or more single-bed position protocols as described in FIG. 9.

In some embodiments, process 800 may further include an operation of image reconstruction. In 880, the image may be reconstructed based on the imaging data. In some embodiments, operation 880 may be implemented by the reconstruction module 125 of the processing device 140. In some embodiments, operation 880 may be implemented by a reconstruction module of a device included in the imaging system 100. Exemplary reconstruction techniques may include Fourier reconstruction, constrained image reconstruction, regularized image reconstruction, iterative reconstruction, filtered back projection (FBP) reconstruction, fan-beam reconstruction, analytic reconstruction, or the like, or a variation thereof, or a combination thereof.

In the following descriptions, an MRI device are illustrated as an example to describe some operations of process 800 for illustration purposes and not intended to be limiting. In an MRI scanning, a target MRI protocol group may be generated by adjusting one or more parameters of an initial MRI protocol group to achieve a clinical requirement. Each of the plurality of target primary MRI protocols may correspond to a target bed position. After the target MRI protocol group has been generated, the MRI scanning for all the plurality of target bed positions may be activated by a confirmation operation, such as pressing an activate key by a user of the MRI device. The MRI scanning may be performed by a one by one scanning for each of the plurality of target bed positions based on the plurality of target primary MRI protocols and one or more supplement MRI protocols. If the MRI scanning is corresponding to one target bed position, then an image generated after the scanning may be a final image satisfy a clinical requirement. If the MRI scanning is corresponding to more than one bed positions, then a bed (e.g., the bed 112) of the MRI device may be moved in the scanning. The MRI device may automatically move the bed between scanning corresponding to two bed positions, and a next scan may be performed automatically without user input. After a scan corresponding to all of the bed positions has finished, the MRI device may stitch an MRI image based on some preset stitching parameters. Under such a controlling process, a count of protocol editing and/or localizing in the MRI scanning may be reduced.

It should be noted that the above description of the process of scanning an object is merely provided for the purposes of illustration, and not intended to limit the scope of the present disclosure. For persons having ordinary skills in the art, multiple variations and modifications may be made under the teachings of the present disclosure. For example, process 800 may further include an operation of determining an object to be imaged. As another example, process 800 may further include an operation of outputting the reconstructed image. Such variations and modifications do not depart from the scope of the present disclosure.

Figure 9:
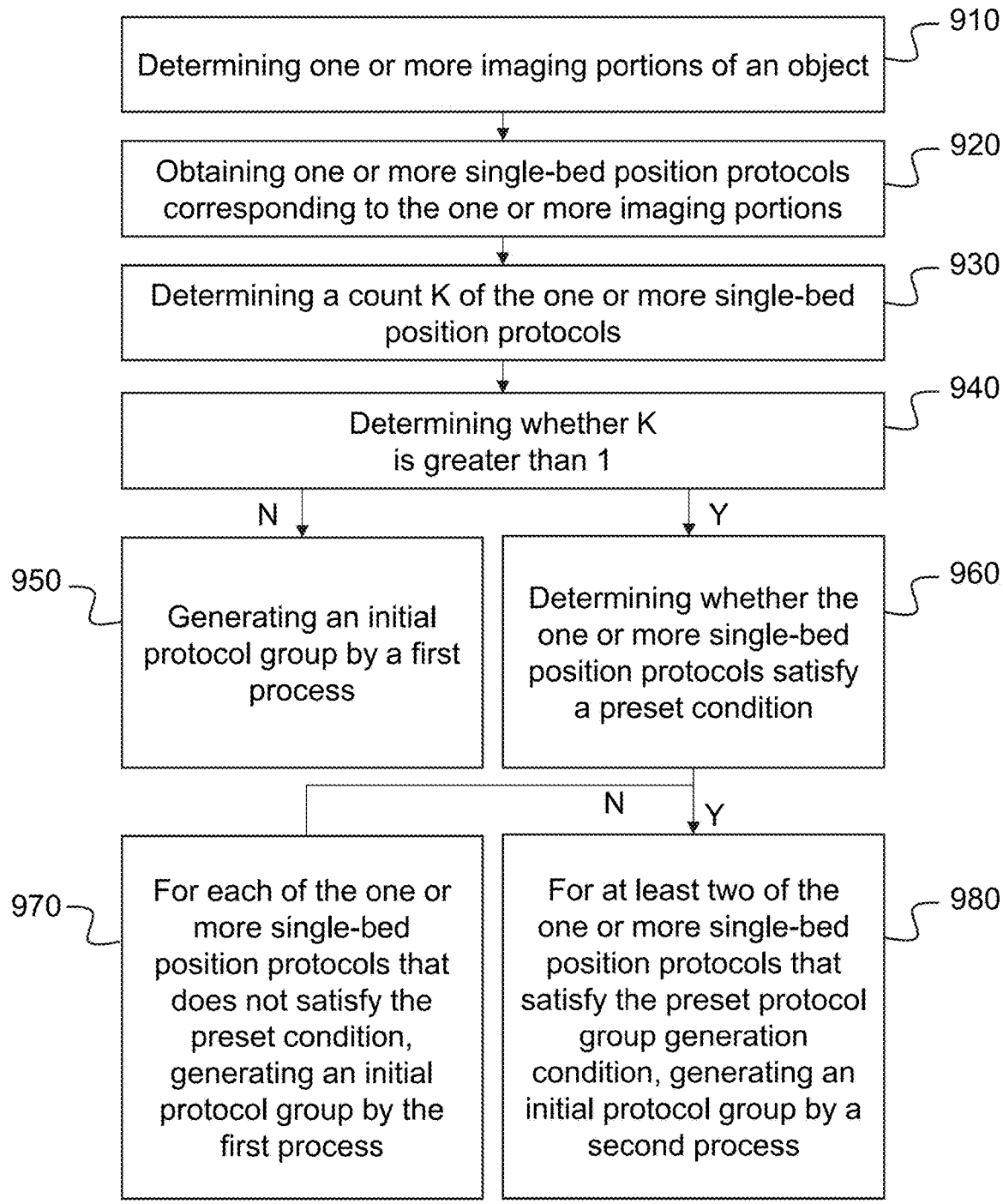
FIG. 9 is a flowchart illustrating an exemplary process of generating one or more initial protocol groups according to some embodiments of the present disclosure.

FIG. 9 is a flowchart illustrating an exemplary process 900 of generating one or more initial protocol groups according to some embodiments of the present disclosure. In some embodiments, one or more operations of the process 900 illustrated in FIG. 9 may be implemented in the imaging system 100 illustrated in FIG. 1. For example, the process 900 illustrated in FIG. 9 may be stored in the storage device 150 in the form of instructions, and invoked and/or executed by the initial protocol group generation module 105 of the processing device 140 (e.g., the processor of a computing device).

In some embodiments, the one or more initial protocol groups may be generated based on one or more single-bed position protocols corresponding to each of one or more imaging portions of an object. The one or more initial protocol groups may be a combination and adjustment of the one or more single-bed position protocols instead of a complete redesign based on the one or more imaging portions.

In 910, one or more imaging portions of an object may be determined. The one or more imaging portions may be any portion(s) of the object, for example, the head, the neck, the thorax, the abdomen, the pelvis, an upper leg, a lower leg, or the like, or any combination thereof. The determination of the one or more imaging portions may be performed based on information input by a user of the imaging system 100 or retrieved from a storage (e.g., the storage device 150, a storage in the processing device 140, a storage in the one or more terminals 130). For example, the one or more imaging portions of the object may be determined by a user of the imaging system 100 through the one or more terminals 130. As another example, the information on the basis of which the one or more imaging portions of the object are determined may be retrieved from a patient database in the storage device 150 via the network 120.

In 920, one or more single-bed position protocols corresponding to the one or more imaging portions of the object may be obtained. The one or more single-bed position protocols may be stored in the storage device 150 and/or any other storage devices disclosed anywhere in the present disclosure. Each of the one or more single-bed position protocols may correspond to the one or more imaging portions of the object. In some embodiments, obtaining the one or more single-bed position protocols corresponding to the one or more imaging portions of the object may include obtaining a single portion scanning protocol, a combined portion scanning protocol, or a combination thereof. For example, obtaining the one or more single-bed position protocols corresponding to the head and the neck of the object may include obtaining a head scanning protocol and a neck scanning protocol. As another example, obtaining the one or more single-bed position protocols corresponding to the head and the neck of the object may include obtaining a scanning protocol for a combined head and neck scan. In some embodiments, some scanning parameters (e.g., a scanning sequence) may be used as a condition for obtaining the one or more single-bed position protocols. If at least two single-bed position protocols corresponding to one imaging portion of the object are obtained in operation 920, the at least two single-bed position protocols may include scanning protocols for difference slice directions (e.g., a sagittal plane direction, a coronal plane direction, a transverse plane direction), different slice types (e.g., a 2D slice, a 3D slice, or a 4D slice). For example, for the thorax of the object, a 2D protocol and a 3D protocol may be obtained. As another example, for the head of the object, a sagittal plane protocol and a coronal plane protocol may be obtained.

In 930, a count K of the one or more single-bed position protocols may be determined. The count K may be determined by a protocol manager of the processing device 140. In some embodiments, the count K may be determined based on identification information of the one or more single-bed position protocols, such as a protocol ID.

In 940, whether the count K is greater than 1 may be determined. If it is determined that the count K is not greater than 1, an initial protocol group may be generated in 950. If it is determined that the count K is greater than 1, whether the one or more single-bed position protocols satisfy a preset condition may be determined in 960.

In 950, an initial protocol group may be generated based on a first process. More descriptions regarding the first process may be found elsewhere in the present disclosure. See, e.g., FIG. 10 and relevant descriptions thereof.

In 960, whether the one or more single-bed position protocols satisfy a preset condition may be determined. The preset condition may be stored in the processing device 140 or retrieved from any other components of the imaging system 100. The preset condition may correspond to one or more scanning characteristics defined by the plurality of single-bed position protocols, for example, a scanning sequence, an imaging region, an overlap imaging region, a position of a bed where the object is supported during the scanning, or the like, or a combination thereof. In some embodiments, the preset condition may include more than one sub-conditions (e.g., a first sub condition corresponding to a scanning sequence, a second sub condition corresponding to an overlap imaging region). A priority of the more than one sub-conditions may be set to be the same or different. For example, for two sub-conditions of different priorities, a sub condition with a higher priority may be used first; if the sub condition of the higher priority is satisfied, then the sub condition with a lower priority may be used. In some embodiments, satisfying the preset condition may indicate all of the sub-conditions are satisfied. In some embodiments, satisfying the preset condition may indicate a part (e.g., 3 of 4) of the sub-conditions are satisfied. For example, operation 960 may employ 4 sub-conditions; if at least 3 of the 4 sub-conditions are satisfied, then it may be determined that the one or more single-bed position protocols satisfy the preset condition in 960.

In some embodiments, the preset condition may include at least one of the one or more single-bed position protocols that share the same scanning sequence. For example, if the scanning sequences of two single-bed position protocols are both a GRE sequence, then the two single-bed position protocols may be determined as satisfying the preset condition. In some embodiments, the present condition may include at least two imaging regions defined by the one or more single-bed position protocols that have an overlap region. The size (e.g., area, length) of the overlap region may have a minimum threshold (e.g., the minimum size of the overlap region) or maximum threshold (e.g., the maximum size of the overlap region), or fall within a range defined by a lower limit and an upper limit of the size (e.g., area, length) of the overlap region. In some embodiments, the preset condition may include bed positions defined by the one or more single-bed position protocols are within a range in a direction along the length of the bed. For example, if a first bed position defined by a first single-bed position protocol is 0 cm, a second bed position defined by a second single-bed position protocol is 70 cm, and a length of the bed may be 70 cm, then the first single-bed position protocol and the second single-bed position protocol may satisfy the preset condition.

In some embodiments, operation 960 may include determining whether part of the one or more single-bed position protocols (e.g., single-bed position protocols B, C, and D) satisfy the preset condition. If it is determined that a single-bed position protocol (e.g., the single-bed position protocol B) in combination with any other protocols (e.g., the single-bed position protocols C or D) does not satisfy the preset condition, operation 970 may be performed. If it is determined that at least two of the one or more single-bed position protocols satisfy the preset condition, operation 980 may be performed. For example, the one or more single-bed position protocols may include a head single-bed position protocol, a thorax single-bed position protocol, and an abdomen single-bed position protocol, and the three protocols do not satisfy the preset condition. In such a case, the head single-bed position protocol may be further processed in 970, and the thorax single-bed position protocol and the abdomen single-bed position protocol may be further processed in 980.

Figure 10:
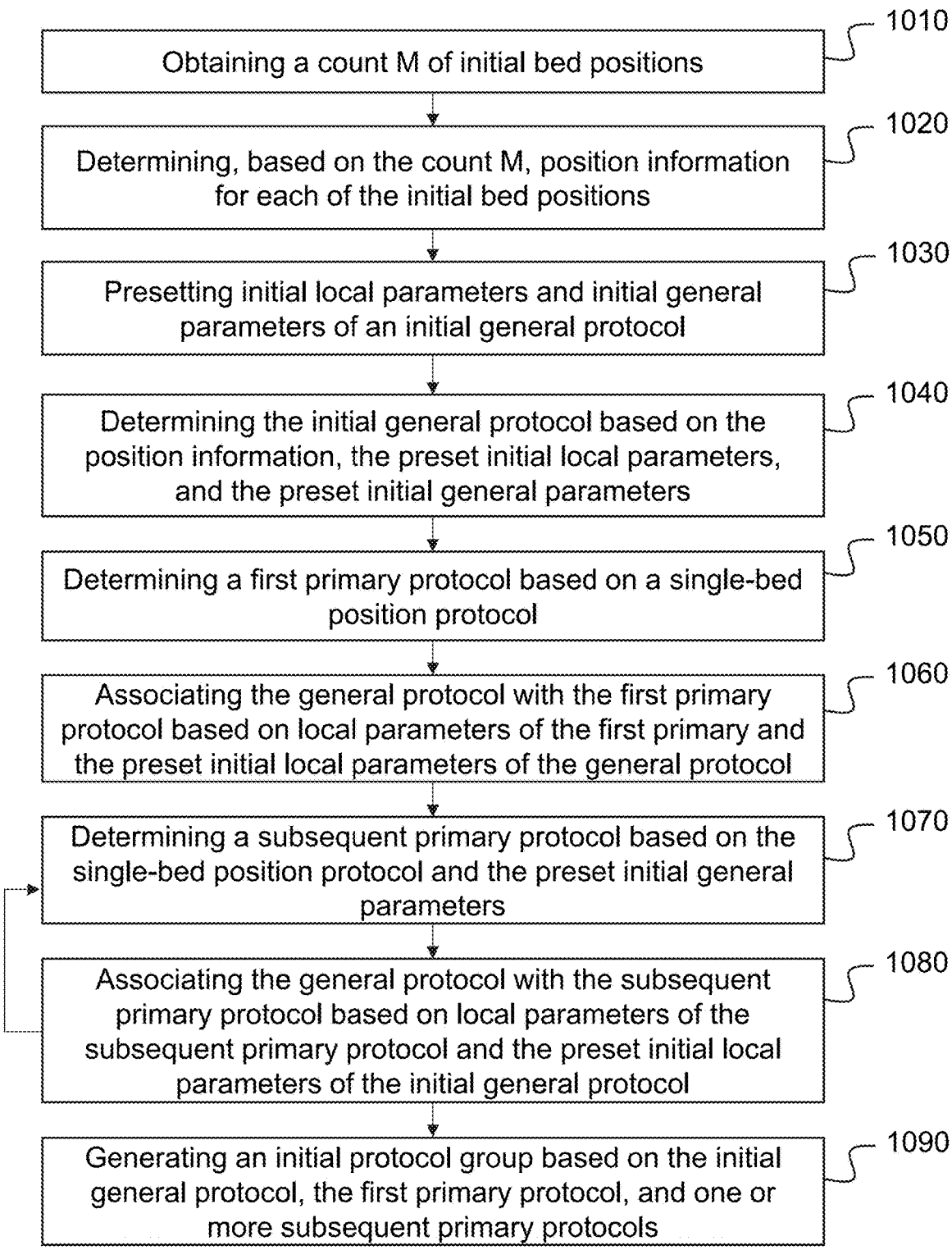
FIG. 10 is a flowchart illustrating an exemplary process of generating an initial protocol group based on a single-bed position protocol according to some embodiments of the present disclosure.

In 970, an initial protocol group may be generated, based on each of the one or more single-bed position protocols that do not satisfy the preset condition, by the first process as described in FIG. 10 and the description thereof. The initial protocol group may be stored in the processing device 140 or transmitted to any components of the imaging system 100 via the network 120. If a count P of single-bed position protocols that do not satisfy the preset condition is more than one, then operation 970 may be performed P times. More descriptions regarding the first process may be found elsewhere in the present disclosure. See, e.g., FIG. 10 and relevant descriptions thereof.

In 980, an initial protocol group may be generated based on those (e.g., at least two) of the one or more single-bed position protocols that satisfy the preset condition, by a second process. For example, the one or more single-bed position protocols may includes protocols P1, P2, P3, and P4. If the group composed of P1, P2, P3, and P4 does not satisfy a preset condition, while the group composed of P2, P3, and P4 satisfies the preset condition, then an initial protocol group may be generated based on P2, P3, and P4. The initial protocol group may be stored in the processing device 140 or transmitted to any components of the imaging system 100 via the network 120. More descriptions regarding the second process may be found elsewhere in the present disclosure. See, e.g., FIG. 11 and relevant descriptions thereof.

It should be noted that the above description of the process of generating one or more initial protocol groups is merely provided for the purposes of illustration, and not intended to limit the scope of the present disclosure. For persons having ordinary skills in the art, multiple variations and modifications may be made under the teachings of the present disclosure. For example, operation 940 may be combined into operation 960. As another example, process 900 may further include an operation of checking the validity of the one or more single-bed position protocols. Such variations and modifications do not depart from the scope of the present disclosure.

FIG. 10 is a flowchart illustrating an exemplary process 1000 of generating an initial protocol group based on a single-bed position protocol according to some embodiments of the present disclosure. In some embodiments, one or more operations of the process 1000 illustrated in FIG. 10 for initial protocol group generation may be implemented in the imaging system 100 illustrated in FIG. 1. For example, the process 1000 illustrated in FIG. 10 may be stored in the storage device 150 in the form of instructions, and invoked and/or executed by the processing device 140 (e.g., the processor of a computing device).

In 1010, a count M of initial bed positions may be obtained. The count M of the initial bed positions may any positive integer equal to or greater than 2, for example, 2, 3, and 4, etc. The count M may be a default value stored in the processing device 140 or retrieved from any other components of the imaging system 100. The default value may be an empirical value. In some embodiments, the count M may be inputted by a user of the imaging system 100.

In 1020, position information for each of the initial bed positions may be determined based on the count M. The position information may include starting position for each of the initial bed positions, ending position for each of the initial bed positions, length information for an imaging region corresponding to each of the initial bed positions, or overlap information for every two adjacent initial bed positions.

In 1030, initial local parameters and initial general parameters of an initial general protocol may be preset. The preset initial general parameters may include a preset scanning order and an overlap imaging region between every two adjacent initial bed positions. In some embodiments, the length of the overlap imaging region along a length of a bed may have a minimum threshold (e.g., 0.5 cm, 1 cm, 2 cm). The initial local parameters may include a protocol ID, slice group information, a slice gap, a slice thickness, an FoV (Field of View) read, an FoV phase, dimension information (e.g., 2D, 3D, 4D), overlap region information, or identification information of a bed position, or the like, or any combination thereof. The initial local parameters of the general protocol and the initial general parameters may be preset based on position information for each of the initial bed positions, the single-bed position protocol, or any preset algorithm. In some embodiments, the presetting the initial local parameters and initial general parameters of an initial general protocol may include determining which parameters to be included, while the values of these parameters, e.g., the initial local parameters and/or the initial general parameters, may be left undetermined until 1050 described below.

In 1040, the initial general protocol may be determined based on the position information for each of the initial bed positions, the preset initial local parameters, and the preset initial general parameters.

In 1050, a first primary protocol may be determined based on a single-bed position protocol. For example, local parameters of the first primary protocol may be determined based on local parameters of the singled-bed position protocol. In some embodiments, the first primary protocol may include a copy of the single-bed position protocol.

In 1060, the initial general protocol may be associated with the first primary protocol based on the local parameters of the first primary protocol and the preset initial local parameters of the initial general protocol.

In 1070, a subsequent primary protocol may be determined based on the single-bed position protocol and the preset initial general parameters. In some embodiments, the subsequent primary protocol may be determined based on the single-bed position protocol, the preset scanning order, and the overlap imaging region between every two adjacent initial bed positions. For example, local parameters of the subsequent primary protocol may be determined based on local parameters of the singled-bed position protocol. Except for an ID, scanning parameters (e.g., the local parameters) in the subsequent primary protocol may be the same as scanning parameters (e.g., the local parameters) in the single-bed position protocol.

In 1080, the initial general protocol may be associated with the subsequent primary protocol based on the local parameters of the subsequent primary protocol and the preset initial local parameters of the initial general protocol.

In 1090, an initial protocol group may be generated based on the initial general protocol, the first primary protocol, and the one or more subsequent primary protocols. In some embodiments, the preset initial local parameters of the initial general protocol may be updated based on the local parameters of the first primary protocol and the one or more subsequent primary protocols.

In some embodiments, if the count M is 2, then one subsequent primary protocol other than the first primary protocol may be determined based on operations 1070-1080 and the initial protocol group may be generated based on the first primary protocol and one subsequent primary protocol. In some embodiments, the count M may be greater than 2 and operations 1070-1080 may be repeated for (M−1) times and determine (M−1) subsequent primary protocols. For example, if the count M is 3, the initial protocol group may be generated based on the first primary protocol and two subsequent primary protocols. If there are at least two subsequent primary protocols generated, at least two of the subsequent primary protocols may be ordered based on a scanning order defined in the initial general protocol. At least two bed positions corresponding to the at least two subsequent primary protocols may be determined, and presetting initial general parameters in operation 1030 may include presetting overlap imaging region information for the at least two bed positions and bed position corresponding to the first primary protocol.

It should be noted that the above description of the process of generating the initial protocol group is merely provided for the purposes of illustration, and not intended to limit the scope of the present disclosure. For persons having ordinary skills in the art, multiple variations and modifications may be made under the teachings of the present disclosure. For example, process 1000 may further include updating the initial protocol group based on a user input after operation 1090. As another example, process 1000 may further include an operation of displaying the initial protocol group in an interface. As still another example, operation 1030 may be omitted. Such variations and modifications do not depart from the scope of the present disclosure.

Figure 11:
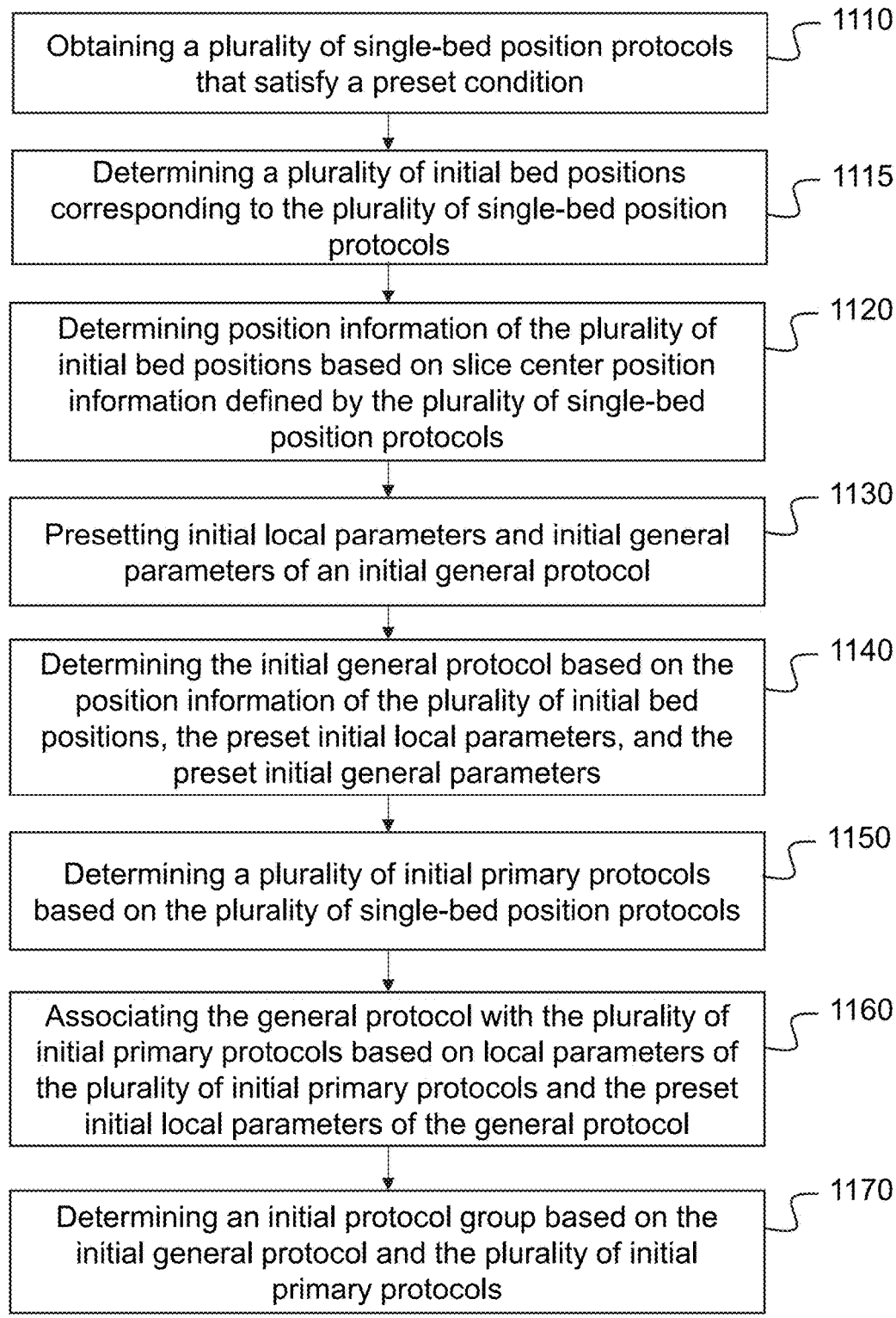
FIG. 11 is a flowchart illustrating an exemplary process of generating an initial protocol group based on a plurality of single-bed position protocols according to some embodiments of the present disclosure.

FIG. 11 is a flowchart illustrating an exemplary process 1100 of generating an initial protocol group based on a plurality of single-bed position protocols according to some embodiments of the present disclosure. In some embodiments, one or more operations of the process 1100 illustrated in FIG. 11 for initial protocol group generation may be implemented in the imaging system 100 illustrated in FIG. 1. For example, the process 1100 illustrated in FIG. 11 may be stored in the storage device 150 in the form of instructions, and invoked and/or executed by the processing device 140 (e.g., the processor of a computing device).

In 1110, a plurality of single-bed position protocols that satisfy a preset condition may be obtained. Each of the plurality of single-bed position protocols may correspond to an initial bed position. For two different single-bed position protocols, the initial bed position which they corresponding to may be the same or different.

In 1115, a plurality of initial bed positions corresponding to the plurality of single-bed position protocols may be determined. In some embodiments, a count of the plurality of initial bed positions may be equal to a count of the plurality of single-bed position protocols. In some embodiments, a count of the plurality of initial bed positions may be larger than a count of the plurality of single-bed position protocols by adding one or more extra initial bed positions. By adding the one or more extra initial bed positions, imaging region deviation may be reduced or avoided. For example, a head single-bed position protocol, a thorax single-bed position protocol, and an abdomen single-bed position protocol may be obtained in operation 1110 and the three single-bed position protocols may correspond to three initial bed positions, i.e., a head bed position, a thorax bed position, and an abdomen bed position. The three initial bed positions may be not continuous due to missing a neck bed position. In 115, a neck bed position may be added to fully occupy a continuous imaging region and four initial bed positions may be determined based on the three initial bed positions and the added neck bed position. The scanning status (scanning to be performed or not) relating to the added initial bed position may be different from the other initial bed positions. For example, the added initial bed position may be set to be skipped or omitted in a scanning. As another example, the scanning time of the added initial bed position may be set to be zero.

In 1120, position information of the plurality of initial bed positions may be determined based on slice center position information defined by the plurality of single-bed position protocols. In some embodiments, the position information may include first position information of the initial bed position corresponding to each of the plurality of single-bed position protocols and second position information of the one or more added initial bed positions. The first position information may be determined based on slice center position information defined by the plurality of single-bed position protocols. The second position information may be determined based on the first position information.

In 1130, initial local parameters and initial general parameters of an initial general protocol may be preset.

In 1140, the initial general protocol may be determined based on the position information of the plurality of initial bed positions, the preset initial local parameters, and the preset initial general parameters.

In 1150, a plurality of initial primary protocols may be determined based on the plurality of single-bed position protocols. Each of the plurality of initial bed positions in 1115 may correspond to an initial primary protocol. It may mean that a count of the plurality of initial primary protocols may be equal to or greater than the count of the plurality of single-bed position protocols. Each of the plurality of initial primary protocols may be determined based on one of the plurality of single-bed position protocols that correspond to the same initial bed position. For the added initial bed position, an initial primary protocol may be determined based on any one of the plurality of single-bed position protocols. In some embodiments, the plurality of initial primary protocols may further be determined based on a preset scanning direction, slice center position information defined by the plurality of single-bed position protocols, and preset overlap information between every two adjacent bed positions of the plurality of initial bed positions. For example, an order of the plurality of initial primary protocols may be determined based on the preset scanning direction, the slice center position information, and the preset overlap information. The plurality of initial primary protocols may be arranged by the order. The position information of a slice center may refer to information that can identify the slice center in an imaging region corresponding to a bed position.

In 1160, the initial general protocol may be associated with the plurality of initial primary protocols based on local parameters of the plurality of initial primary protocols and the preset initial local parameters of the general protocol. In some embodiments, preset general parameters of the initial general protocol may be updated based on the preset scanning direction, the slice center position information, and the preset overlap information.

In 1170, an initial protocol group may be generated based on the initial general protocol and the plurality of initial primary protocols.

It should be noted that the above description of the process of generating the initial protocol group is merely provided for the purposes of illustration, and not intended to limit the scope of the present disclosure. For persons having ordinary skills in the art, multiple variations and modifications may be made under the teachings of the present disclosure. For example, process 1100 may further include updating the initial protocol group based on a user input after operation 1170. As another example, process 1100 may further include an operation of displaying the initial protocol group in an interface. Such variations and modifications do not depart from the scope of the present disclosure.

Figure 12:
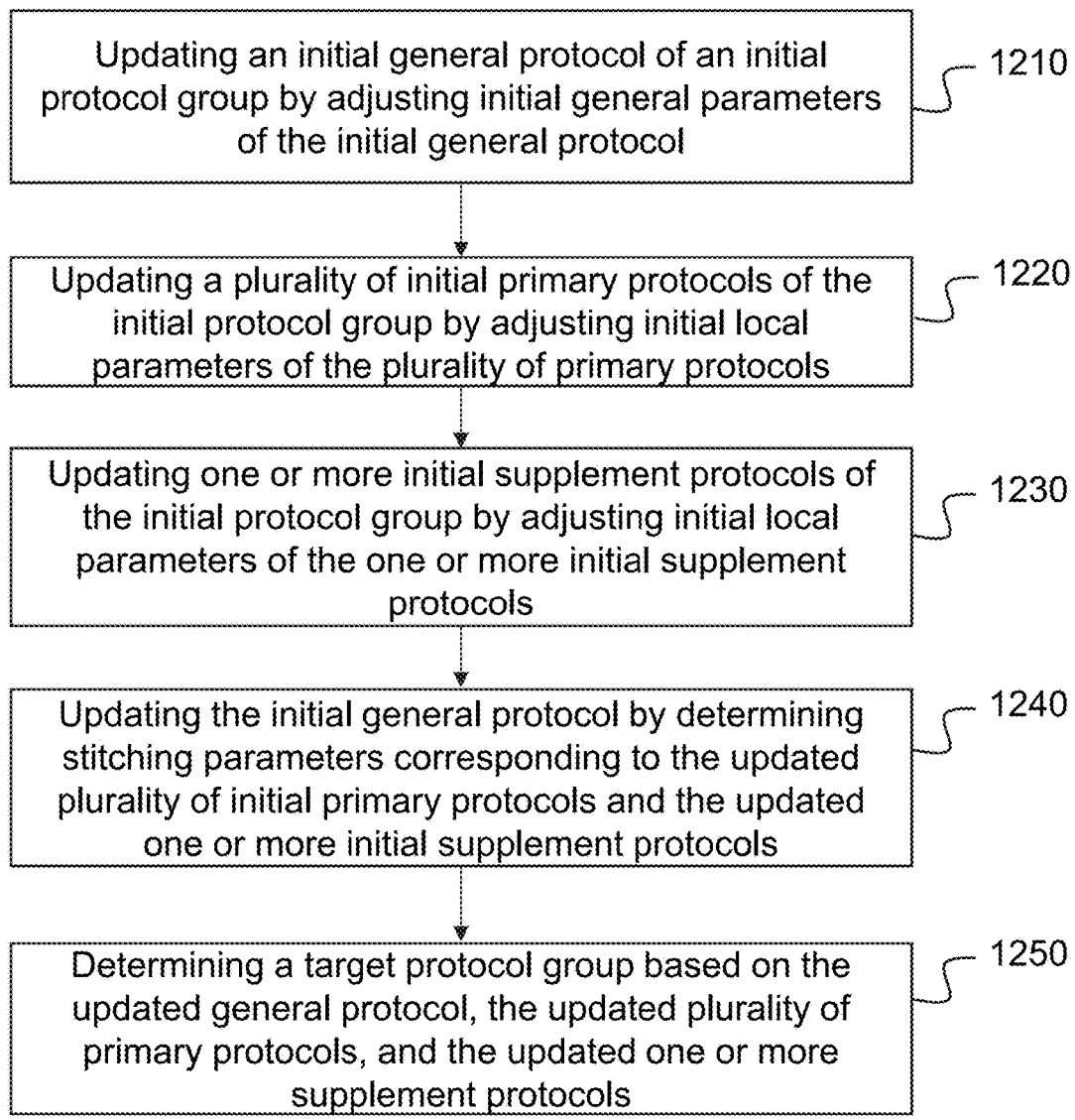
FIG. 12 is a flowchart illustrating an exemplary process of determining a target protocol group for an object based on an initial protocol group according to some embodiments of the present disclosure.

FIG. 12 is a flowchart illustrating an exemplary process 1200 of determining a target protocol group for an object based on an initial protocol group according to some embodiments of the present disclosure. In some embodiments, one or more operations of the process 1200 illustrated in FIG. 2 for target protocol group generation may be implemented in the imaging system 100 illustrated in FIG. 1. For example, the process 1200 illustrated in FIG. 12 may be stored in the storage device 150 in the form of instructions, and invoked and/or executed by the processing device 140 (e.g., the processor of a computing device). In some embodiments, the process 1200 may be performed through interfaces as shown in FIGS. 7A, 7B, and 13. The initial protocol group generated in a protocol manager may be uploaded to a checklist and further to be edited.

The process for adjusting the initial protocol group to generate the target protocol group may be the same for different types of initial protocol groups (e.g., an initial protocol group corresponding to a scanning of the object at a single-bed position or an initial protocol group corresponding to a scanning of the object at more than one bed positions). In the following descriptions, an initial protocol group corresponding to a scanning of the object at more than one bed positions may be taken as an example to explain the process 1200 for illustration purposes and not intended to be limiting.

In 1210, an initial general protocol of the initial protocol group may be updated by adjusting initial general parameters of the initial general protocol. The initial protocol group may be a template protocol group that may be unsuitable for all objects to be scanned, so an adjustment of the initial general protocol needs to be performed to adapt it to the scanning of the object. The adjustment of the initial general parameters of the initial general protocol may be performed based on the information of the object. The information of the object may include a reference image, a height of the object, ROI information of the object, outline information of the object, or the like, or a combination thereof. The initial general parameters to be adjusted may include a count of a plurality of initial bed positions corresponding to the initial general protocol, a combined imaging region of the plurality of initial bed positions, an overlap imaging region between two adjacent initial bed positions of the plurality of initial bed positions, or the like, or a combination thereof.

In some embodiments, adjusting the initial general parameters may include adjusting the count of a plurality of initial bed positions and/or the combined imaging region based on the height of the object. For example, if the height of the object is shorter than that represented in the template protocol group, the count of the plurality of initial bed positions may be reduced to reduce the combined imaging region. As another example, the combined imaging region may be reduced for a shorter object without reducing the count of the plurality of initial bed positions but reducing the length of the imaging region of one or more of the plurality of initial bed positions. As still another example, the combined imaging region may be reduce by reducing the length of the imaging region for one or more of the plurality of initial bed positions and also the count of the plurality of initial bed positions at the same time to adapt to the shorter object. In some embodiments, the adjusting the initial general parameters may include adjusting the combined imaging region of the plurality of initial bed positions and/or the overlap imaging region between two adjacent initial bed positions based on the ROI information of the object (e.g., information of a tumor region, information of organs of interest). In some embodiments, the initial general parameters may be adjusted such that no ROI region falls within the overlap imaging region between two adjacent initial bed positions when the object is scanned. In some embodiments, the initial general parameters may be adjusted based on both the ROI information and the height of the object. In some embodiments, the imaging system 100 may include an intelligent localization function. An automatic imaging region adjustment operation may be performed by the imaging system 100 without a manual operation or user input in an automatic approach. For example, based on a reference image, a general protocol may be adjusted automatically to determine an imaging region for each of the initial bed positions. As another example, a general protocol may be adjusted automatically, or semi-automatically, or manually, such that an ROI is positioned at a specific region at a bed position, e.g., in a center region of the FOV of the imaging device 110 at a bed position. In a semi-automatic approach, the general protocol may be adjusted by a computing device (e.g., the computing device 200 as illustrated in FIG. 2) with user intervention. For example, the general protocol may be adjusted by the computing device based on a general protocol adjustment algorithm in combination with information provided by a user. Exemplary user intervention in a semi-automatic approach for the general protocol adjustment may include providing a parameter relating to the general protocol adjustment algorithm, providing a position parameter relating to an ROI, making an adjustment to or confirming a preliminary general protocol adjustment performed by the computing device, providing instructions to cause the computing device to repeat or redo the general protocol adjustment, etc. In a manual approach, the general protocol may be generated according to an instruction provided by a user. For example, via a user interface implemented on, e.g., a terminal 130 or a mobile device 300 as illustrated in FIG. 3, a user may input initial general parameters of the general protocol.

In some embodiments, software for protocol editing (e.g., a protocol manager) may be used to visually present the initial protocol group on a display and a human-computer interface may be employed to facilitate the parameter adjustment. The initial protocol group may be input to the software against a checklist in the software and displayed to a user. An initial bed position adding or deleting may be achieved by one or more operations supported by the software (e.g., right clicking a mouse at a position of the interface where an icon corresponding to a specific selection is displayed, pressing one or more shortcut keys to input a user instruction). An initial general protocol may be opened and displayed in a slice localization window for further adjustments.

For example, an interface 1300 as shown in FIG. 13 may display an initial general protocol 1301. The initial general protocol 1301 may be an embodiment of the general protocol 601 as described in FIG. 6. A combined imaging region 1310 of all the initial bed positions (i.e., bed position 1, bed position 2, bed position 3, bed position 4, and bed position 5), an overlap imaging region 1302, and a particular imaging region corresponding to a bed position (e.g., an imaging region 1311) may be displayed. Based on ROI information and a height of an object, a user may stretch or compress the combined imaging region 1310 and the overlap imaging region 1302 displayed in the interface 1300 directly to adjust the initial general parameters. The imaging system 100 may automatically adjust the initial general parameters in the initial general protocol 1301 accordingly. Also, a scanning direction (e.g., from head to toe, from toe to head) 1304 may also be adjusted by a user in a visualization manner.

In 1220, a plurality of initial primary protocols of the initial protocol group may be updated by adjusting initial local parameters of the plurality of initial primary protocols. The adjustment of the initial local parameters may be performed based on information of the object and/or information inputted by a user.

In some embodiments, the initial local parameters may be edited in the form of a parameter editing card which includes the initial local parameters. The initial local parameters editable herein may include a physiological trigger signal, a workflow type, or the like, or a combination thereof. The physiological trigger signal may include an electrocardiogram (ECG) signal (e.g., a R-wave of a QSR complex), a pulse signal, a respiratory signal, or the like. The workflow type may include an automated workflow, a manual workflow, a holdbreath workflow, or a combined workflow. In the automated workflow, a protocol (e.g., a target protocol group) may be performed automatically after preparation operations are completed (e.g., the imaging system 100 receiving a preparation completion signal). In the manual workflow, the imaging system 100 may still be in an idle or pause status even if the preparation operations are completed until a restart signal is received. The restart signal may be sent by the imaging system 100 based on an input of a user (e.g., a healthcare provider) based on the condition of a patient to be scanned. In the holdbreath workflow, a scanning may be divided into more than one scanning stages. The imaging system 100 may be in a pause status before starting a subsequent scanning stage. During the pause status, a user (e.g., a healthcare provider) may direct the patient to hold breath for the subsequent scanning stage. In some embodiments, the initial local parameters may be edited in a form displayed on an interface as shown in FIG. 13. For example, by rotating or translating an operating handle 1303, an imaging region 1311 corresponding to a bed position 1 may be adjusted. The interface 1300 may further provide a combining function for combining more than one imaging region to be adjusted simultaneously.

It should be noted that the general initial protocol is associated with the plurality of initial primary protocols. Adjusting local parameters in the general initial protocol may lead to a corresponding adjustment of one or more local parameters in one or more of the plurality of initial primary protocols, or vice versa. Under such a mechanism, the parameter adjustment of the plurality of initial primary protocols may be achieved simultaneously as the general initial protocol is adjusted.

In 1230, one or more initial supplement protocols of the initial protocol group may be updated by adjusting local parameters of the one or more initial supplement protocols. The process for adjusting the one or more initial supplement protocols may be the same as the plurality of initial primary protocols. It should be noted that bed position adjustment corresponding to an initial supplement protocol may be automatically synchronized to a corresponding initial primary protocol.

In 1240, stitching parameters in the updated initial general protocol may be determined such that the stitching parameters may correspond to the updated primary protocols and the updated one or more initial supplement protocols. The determination of the stitching parameters may be performed before, simultaneously as, or after the parameter adjustment described in operations 1210-1230. In some embodiments, by right clicking a mouse or inputting some characters, the stitching parameters may be set. The stitching parameters may indicate a stitching order of imaging data acquired at the one or more bed positions. For example, in FIG. 7A, numbers in the region 712 may indicate that all images acquired during the scan need to be stitched to an image corresponding to the bed position 701. In some embodiments, a cross bed position stitching may be supported. For example, stitching operations may be performed based on a first image corresponding to a head bed position and a second image corresponding to an abdomen bed position.

In 1250, a target protocol group may be determined based on the updated general protocol, the updated plurality of primary protocols, and the updated one or more supplement protocols. The target protocol group may be displayed in a visualization interface as shown in FIG. 14.

By using one or more interface as shown in FIGS. 7A, 7B, and 13, a visualization and convenience parameter adjustment may be performed, and individualization or personalization of the target protocol group and protocol planning efficiency may be enhanced. An imaging region adjustment may be performed in a more efficient approach and the success rate of stitching may also be enhanced.

It should be noted that the above description of the process of determining a target protocol group is merely provided for the purposes of illustration, and not intended to limit the scope of the present disclosure. For persons having ordinary skills in the art, multiple variations and modifications may be made under the teachings of the present disclosure. For example, process 1200 may further include supplementing or deleting a supplement protocol to the target protocol group. As another example, operations 1220, 1230 and/or 1240 may be omitted. Such variations and modifications do not depart from the scope of the present disclosure.

FIG. 13 is a schematic diagram illustrating an exemplary interface 1300 according to some embodiments of the present disclosure. The interface may be provided via the processing device 140.

The interface 1300 may be configured to display an initial protocol group and provide an operating interface for presenting and/or editing the initial protocol group to generate a target protocol group. The interface 1300 may further be configured to display the target protocol group and provide an operating interface for adjusting the target protocol group.

As shown in FIG. 13 the interface may display several imaging regions 1311, 1312, 1313, 1314, and 1315 corresponding to several bed positions 1, 2, 3, 4, and 5, respectively. An overlap imaging region 1302 (e.g., 1302a, 1302b, 1302c, 1302d) may exist between two imaging regions corresponding two adjacent initial bed positions. For example, the imaging region 1311 and the imaging region 1312 may have an overlap imaging region 1302a. A scanning direction of the initial protocol group displayed in the interface 1300 may be indicated by symbol 1304. The initial protocol group may have a combined imaging region 1301. The icon 1303 may correspond to an operating handle configured to illustrate an adjustment of a corresponding imaging region 1311. Initial local parameters and initial general parameters of the initial protocol group may be adjusted via the interface. More descriptions regarding the adjustment may be found elsewhere in the present disclosure. See, e.g., FIG. 12 and relevant descriptions thereof.

FIG. 14 is a schematic diagram illustrating a reference image 1400 according to some embodiments of the present disclosure. The reference image may include two views, a sagittal view in the left panel of FIG. 14, and a coronal view in the right panel of FIG. 14. Bed position planning information (e.g., a combined imaging region of a plurality of target bed positions, an imaging region for each of a plurality of target bed positions, or an overlap imaging region between two adjacent target bed positions) may be displayed on the reference image. The bed position planning information may be determined based on a target protocol.

FIG. 15 is a schematic diagram illustrating an image 1500 according to some embodiments of the present disclosure. The image 1500 may be a whole-body diffusion-weighted image acquired according to the method disclosed herein. FIG. 16 is a schematic diagram illustrating an image 1600 according to some embodiments of the present disclosure. The image 1600 provides a whole-body spine image acquired according to the method disclosed herein. FIG. 17 is a schematic diagram illustrating an image 1700 according to some embodiments of the present disclosure. The image 1700 may be a whole-body lower leg vascular image acquired according to the method disclosed herein. FIG. 18 is a schematic diagram illustrating an image 1800 according to some embodiments of the present disclosure. The image 1800 may be a whole body soft-tissue image acquired according to the method disclosed herein.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as an "apparatus," "device," "equipment," "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques.

Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one machine each of which has at least one processor and at least one storage device, the method comprising:
   obtaining an initial protocol group, the initial protocol group including an initial general protocol and a plurality of initial primary protocols;
   updating the initial general protocol of the initial protocol group to obtain an updated general protocol, including adjusting one or more initial general parameters of the initial general protocol;
   determining a target protocol group based on the updated general protocol and the plurality of initial primary protocols; and
   acquiring scan data by scanning an object based on the target protocol group.

2. The method of claim 1, further comprising:
   updating the plurality of initial primary protocols of the initial protocol group by adjusting one or more initial local parameters of the plurality of primary protocols to obtain a plurality of updated primary protocols.

3. The method of claim 2, wherein the determining a target protocol group based on the updated general protocol and the plurality of initial primary protocols further includes:
   determining the target protocol group based on the updated general protocol and the plurality of updated primary protocols.

4. The method of claim 1, wherein the initial protocol group further includes one or more initial supplement protocols.

5. The method of claim 4, further comprising:
   updating the one or more initial supplement protocols of the initial protocol group by adjusting one or more initial local parameters of the one or more initial supplement protocols to obtain one or more updated supplement protocols.

6. The method of claim 5, wherein the updating the initial general protocol of the initial protocol group to obtain an updated general protocol further includes:
   updating the initial general protocol by determining one or more stitching parameters corresponding to the plurality of updated primary protocols and the one or more updated supplement protocols.

7. The method of claim 6, wherein the determining a target protocol group based on the updated general protocol further includes:

determining the target protocol group based on the updated general protocol, the plurality of updated primary protocols, and the one or more updated supplement protocols.

8. The method of claim 1, wherein the adjusting one or more initial general parameters of the initial general protocol includes:
adjusting, based on a reference image, the one or more initial general parameters of the initial general protocol.

9. The method of claim 8, wherein the reference image is generated by:
obtaining a reference imaging protocol relating to an object to be imaged, wherein the object is supported on a bed; and
generating the reference image of the object based on the reference imaging protocol.

10. The method of claim 8, wherein the adjusting, based on a reference image, the one or more initial general parameters of the initial general protocol includes:
adjusting the one or more initial general parameters of the initial general protocol based on a height of an object in the reference image and/or region of interest (ROI) information of the object.

11. The method of claim 10, wherein the initial protocol group corresponds to a plurality of initial bed positions, and the one or more initial general parameters includes at least one of:
a first count of the plurality of initial bed positions, a combined imaging region of the plurality of initial bed positions, an imaging region for each of the plurality of initial bed positions, or an overlap imaging region between two adjacent initial bed positions.

12. The method of claim 1, wherein the target protocol group corresponds to a plurality of target bed positions, and the target protocol group includes a target general protocol for localizing the plurality of target bed positions and a plurality of target primary protocols for localizing each of the plurality of target bed positions.

13. The method of claim 12, wherein each of the plurality of target primary protocols includes one or more local parameters, the one or more local parameters includes:
a protocol ID, slice group information, a slice gap, a slice thickness, an FoV (Field of View) read, an FoV phase, dimension information, overlap region information, or identification information of a bed position.

14. The method of claim 12, further comprising:
acquiring scan data by scanning an object based on the target protocol group.

15. The method of claim 14, wherein the target protocol group further includes one or more target supplement protocols, each of the one or more target supplement protocols corresponds to one of the plurality of target primary protocols, and the acquiring scan data by scanning an object based on the target protocol group includes:
for a target primary protocol corresponding to a target bed position and a target supplement protocol corresponding to the target primary protocol,
acquiring first scan data by scanning the object based on the target primary protocol; and
acquiring second scan data by scanning the object based on the target supplement protocol.

16. The method of claim 15, further comprising:
setting a control mode of a bed, wherein the control mode includes a fixed mode, an off-center mode, or a free-bed mode, wherein in the fixed mode, a first position of the bed defined by the target supplement protocol is the same as a second position of the bed defined by the target primary protocol, and a first slice center defined by the target supplement protocol is the same as a second slice center defined by the target primary protocol;
in the off-center mode, the first position of the bed defined by the target supplement protocol is the same as the second position of the bed defined by the target primary protocol, and the first slice center defined by the target supplement protocol is different from the second slice center defined by the target primary protocol; and
in the free-bed mode, the first position of the bed defined by the target supplement protocol is different from the second position of the bed defined by the target primary protocol, and the first slice center defined by the target supplement protocol is different from the second slice center defined by the target primary protocol.

17. The method of claim 1, wherein the obtaining an initial protocol group includes:
determining one or more imaging portions of an object;
obtaining one or more single-bed position protocols corresponding to the one or more imaging portions; and
generating the initial protocol group based on the one or more single-bed position protocols.

18. The method of claim 1, wherein the initial general protocol is associated with each of the plurality of initial primary protocols.

19. A system, comprising:
at least one processor, and
a storage device for storing instructions that, when executed by the at least one processor, cause the system to effectuate operations comprising:
obtaining an initial protocol group, the initial protocol group including an initial general protocol and a plurality of initial primary protocols;
updating the initial general protocol of the initial protocol group to obtain an updated general protocol, including adjusting one or more initial general parameters of the initial general protocol;
determining a target protocol group based on the updated general protocol and the plurality of initial primary protocols; and
acquiring scan data by scanning an object based on the target protocol group.

20. A non-transitory computer readable medium comprising executable instructions that, when executed by at least one processor, cause the at least one processor to effectuate a method comprising:
obtaining an initial protocol group, the initial protocol group including an initial general protocol and a plurality of initial primary protocols;
updating the initial general protocol of the initial protocol group to obtain an updated general protocol, including adjusting one or more initial general parameters of the initial general protocol;
determining a target protocol group based on the updated general protocol and the plurality of initial primary protocols; and
acquiring scan data by scanning an object based on the target protocol group.

* * * * *